(12) United States Patent
Dokter et al.

(10) Patent No.: US 10,867,431 B2
(45) Date of Patent: Dec. 15, 2020

(54) METHODS AND APPARATUS FOR IMPROVING SUBPIXEL VISIBILITY

(71) Applicant: QUALCOMM TECHNOLOGIES, Inc., San Diego, CA (US)

(72) Inventors: Mark Dokter, Graz (AT); Dieter Schmalstieg, Graz (AT); Markus Steinberger, Graz (AT)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

(21) Appl. No.: 16/223,029

(22) Filed: Dec. 17, 2018

(65) Prior Publication Data
US 2020/0193690 A1 Jun. 18, 2020

(51) Int. Cl.
| | |
|---|---|
| *G06T 15/00* | (2011.01) |
| *G06T 15/20* | (2011.01) |
| *G06T 1/20* | (2006.01) |
| *G06T 7/50* | (2017.01) |
| *G06T 15/40* | (2011.01) |
| G06T 9/00 | (2006.01) |

(52) U.S. Cl.
CPC .............. *G06T 15/20* (2013.01); *G06T 1/20* (2013.01); *G06T 7/50* (2017.01); *G06T 15/40* (2013.01); *G06T 9/00* (2013.01); *G06T 15/005* (2013.01)

(58) Field of Classification Search
CPC ........... G06T 15/50; G06T 15/80; G06T 1/20; G06T 7/50; G06T 15/005; G06T 9/00; G06T 15/40; G06T 15/20

USPC ......................................................... 345/418
See application file for complete search history.

(56) References Cited

U.S. PATENT DOCUMENTS

| | | | |
|---|---|---|---|
| 9,965,893 B2* | 5/2018 | Anderson | ............... G06T 15/80 |
| 10,366,534 B2* | 7/2019 | Schoenberg | ......... G02B 27/017 |
| 2008/0143720 A1* | 6/2008 | Elmquist | ................. G06T 15/50 |
| | | | 345/426 |
| 2016/0210722 A1* | 7/2016 | Fortin | ..................... A63F 13/30 |

OTHER PUBLICATIONS

Meder J, Brüderlin B. Decoupling Rendering and Display Using Fast Depth Image Based Rendering on the GPU. InInternational Conference on Computer Vision and Graphics Sep. 19, 2016 (pp. 61-72). Springer, Cham.*

(Continued)

*Primary Examiner* — Phu K Nguyen
(74) *Attorney, Agent, or Firm* — Campbell C. Chiang; Arent Fox LLP

(57) ABSTRACT

The present disclosure relates to methods and devices for operation of a GPU. The device can determine a first subset of primitives associated with a set of objects within an image. The first subset of primitives can be based on a first viewpoint with respect to the set of objects. The device can also determine, for a second viewpoint with respect to the set of objects, a second subset of primitives excluding the first subset of primitives. In some aspects, the second subset of primitives can have a difference in depth with respect to the first subset of primitives that is less than a threshold depth. Additionally, the device can mark the first subset of primitives and the second subset of primitives as visible. Further, the device can generate graphical content based on the marked first subset of primitives and the marked second subset of primitives.

30 Claims, 11 Drawing Sheets

(56) References Cited

OTHER PUBLICATIONS

Westermann R, Sommer O, Ertl T. Decoupling polygon rendering from geometry using rasterization hardware. InRendering Techniques' 99 1999 (pp. 45-56). Springer, Vienna.*

Liktor G, Dachsbacher C. Decoupled deferred shading for hardware rasterization. InProceedings of the ACM SIGGRAPH Symposium on Interactive 3D Graphics and Games Mar. 9, 2012 (pp. 143-150).*

Hedman P, Ritschel T, Drettakis G, Brostow G. Scalable inside-out image-based rendering. ACM Transactions on Graphics (TOG). Nov. 11, 2016;35(6):1-1.*

Yoon SE, Salomon B, Manocha D. Interactive view-dependent rendering with conservative occlusion culling in complex environments. InIEEE Visualization, 2003. VIS 2003. Oct. 19, 2003 (pp. 163-170). IEEE.*

Policarpo, F., Fonseca, F. and Games, C., 2005. Deferred shading tutorial. Pontifical Catholic University of Rio de Janeiro, 31, p. 32.*

Krivanek, Jaroslav. "Representing and rendering surfaces with points." Postgraduate Study Report DC-PSR (2003).*

Crassin C, McGuire M, Fatahalian K, Lefohn A. Aggregate G-buffer anti-aliasing. InProceedings of the 19th Symposium on Interactive 3D Graphics and Games Feb. 27, 2015 (pp. 109-119).*

\* cited by examiner

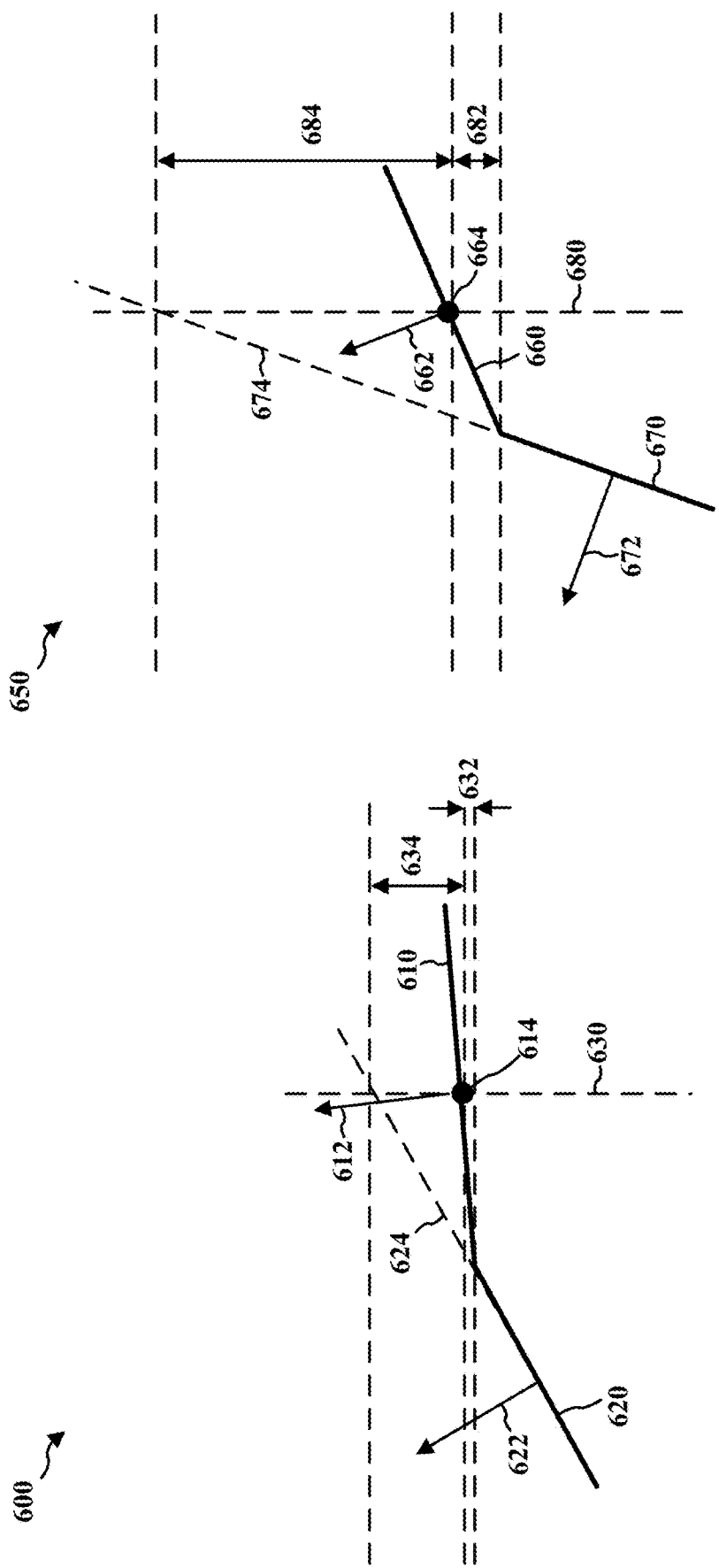

METHODS AND APPARATUS FOR IMPROVING SUBPIXEL VISIBILITY

TECHNICAL FIELD

The present disclosure relates generally to processing systems and, more particularly, to one or more techniques for graphics processing in processing systems.

INTRODUCTION

Computing devices often utilize a video processor or graphics processing unit (GPU) to accelerate the rendering of video or graphical data for display. Such computing devices may include, for example, computer workstations, mobile phones such as so-called smartphones, embedded systems, personal computers, tablet computers, and video game consoles. Video processors or GPUs execute a video or graphics processing pipeline that includes a plurality of processing stages that operate together to execute video or graphics processing commands and output a frame. A central processing unit (CPU) may control the operation of the video processor or GPU by issuing one or more graphics processing commands to the video processor or GPU. Modern day CPUs are typically capable of concurrently executing multiple applications, each of which may need to utilize the video processor or GPU during execution. A device that provides content for visual presentation on a display generally includes a video processor or GPU.

Typically, a video processor or GPU of a device is configured to perform every process in a video or graphics processing pipeline. However, with the advent of wireless communication and the streaming of content, e.g., game content or any other content that is rendered using a GPU, there has developed a need for improved video or graphics processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a first apparatus are provided. The apparatus may be a GPU. In one aspect, the apparatus may determine a first subset of primitives of a set of primitives associated with a set of objects within an image, where the first subset of primitives is based on a first viewpoint with respect to the set of objects. The apparatus can also determine, for a second viewpoint with respect to the set of objects, a second subset of primitives of the set of primitives excluding the first subset of primitives. In some aspects, the second subset of primitives can have a difference in depth with respect to the first subset of primitives that is less than a threshold depth. Additionally, the apparatus can mark the first subset of primitives and the second subset of primitives as visible. Further, the apparatus can generate graphical content based on the marked first subset of primitives and the marked second subset of primitives.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 6A and 6B illustrate an example of depth determination according to the present disclosure.

DETAILED DESCRIPTION

Figure 1:
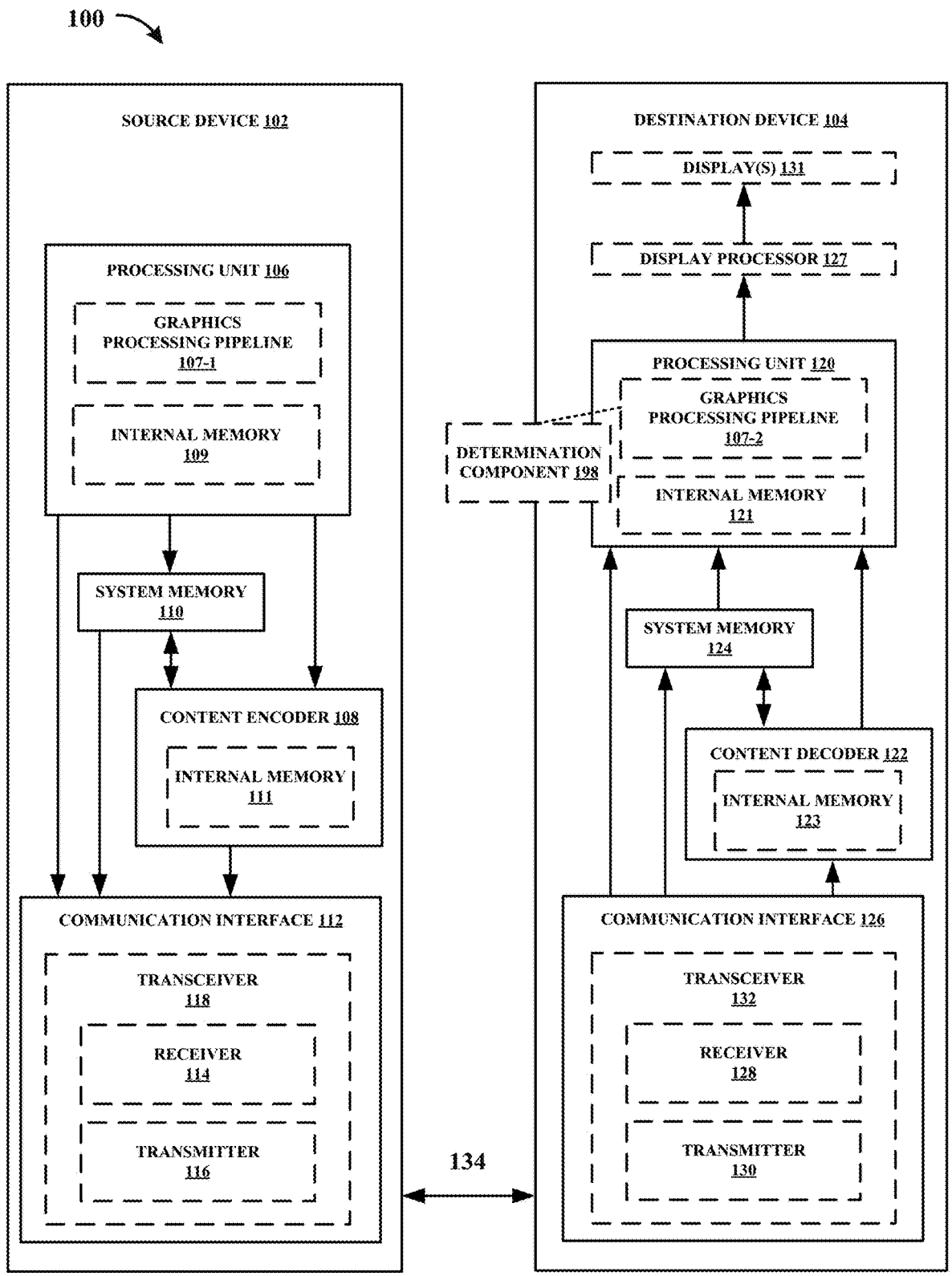
FIG. 1 is a block diagram that illustrates an example content generation and coding system in accordance with the techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include video processors, microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (i.e., software) being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline across multiple devices, improving the coding of video or graphical content, and/or reducing the load of a processing unit (i.e., any processing unit configured to perform one or more techniques described herein, such as a graphics processing unit (GPU)). For example, this disclosure describes techniques for graphics processing in communication systems. Other example benefits are described throughout this disclosure.

As used herein, the term "coder" may generically refer to an encoder and/or decoder. For example, reference to a "content coder" may include reference to a content encoder and/or a content decoder. Similarly, as used herein, the term "coding" may generically refer to encoding and/or decoding. As used herein, the terms "encode" and "compress" may be used interchangeably. Similarly, the terms "decode" and "decompress" may be used interchangeably.

As used herein, instances of the term "content" may refer to the term "video," "graphical content," "image," and vice versa. This is true regardless of whether the terms are being used as an adjective, noun, or other parts of speech. For example, reference to a "content coder" may include reference to a "video coder," "graphical content coder," or "image coder,"; and reference to a "video coder," "graphical content coder," or "image coder" may include reference to a "content coder." As another example, reference to a processing unit providing content to a content coder may include reference to the processing unit providing graphical content to a video encoder. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (i.e., the frame includes two or more layers, and the frame that includes two or more layers may subsequently be blended).

As referenced herein, a first component (e.g., a processing unit) may provide content, such as graphical content, to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

FIG. 1 is a block diagram that illustrates an example content generation and coding system 100 configured to implement one or more techniques of this disclosure. The content generation and coding system 100 includes a source device 102 and a destination device 104. In accordance with the techniques described herein, the source device 102 may be configured to encode, using the content encoder 108, graphical content generated by the processing unit 106 prior to transmission to the destination device 104. The content encoder 108 may be configured to output a bitstream having a bit rate. The processing unit 106 may be configured to control and/or influence the bit rate of the content encoder 108 based on how the processing unit 106 generates graphical content.

The source device 102 may include one or more components (or circuits) for performing various functions described herein. The destination device 104 may include one or more components (or circuits) for performing various functions described herein. In some examples, one or more components of the source device 102 may be components of a SOC. Similarly, in some examples, one or more components of the destination device 104 may be components of an SOC.

The source device 102 may include one or more components configured to perform one or more techniques of this disclosure. In the example shown, the source device 102 may include a processing unit 106, a content encoder 108, a system memory 110, and a communication interface 112. The processing unit 106 may include an internal memory 109. The processing unit 106 may be configured to perform graphics processing, such as in a graphics processing pipeline 107-1. The content encoder 108 may include an internal memory 111.

Memory external to the processing unit 106 and the content encoder 108, such as system memory 110, may be accessible to the processing unit 106 and the content encoder 108. For example, the processing unit 106 and the content encoder 108 may be configured to read from and/or write to external memory, such as the system memory 110. The processing unit 106 and the content encoder 108 may be communicatively coupled to the system memory 110 over a bus. In some examples, the processing unit 106 and the content encoder 108 may be communicatively coupled to each other over the bus or a different connection.

The content encoder 108 may be configured to receive graphical content from any source, such as the system memory 110 and/or the processing unit 106. The system memory 110 may be configured to store graphical content generated by the processing unit 106. For example, the processing unit 106 may be configured to store graphical content in the system memory 110. The content encoder 108 may be configured to receive graphical content (e.g., from the system memory 110 and/or the processing unit 106) in the form of pixel data. Otherwise described, the content encoder 108 may be configured to receive pixel data of graphical content produced by the processing unit 106. For example, the content encoder 108 may be configured to receive a value for each component (e.g., each color component) of one or more pixels of graphical content. As an example, a pixel in the red (R), green (G), blue (B) (RGB) color space may include a first value for the red component, a second value for the green component, and a third value for the blue component.

The internal memory 109, the system memory 110, and/or the internal memory 111 may include one or more volatile or non-volatile memories or storage devices. In some examples, internal memory 109, the system memory 110, and/or the internal memory 111 may include RAM, static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 109, the system memory 110, and/or the internal memory 111 may be a non-transitory storage medium according to some examples. The term "non-transitory" may indicate that the storage medium is not embodied in a carrier wave or a propagated signal. However, the term "non-transitory" should not be interpreted to mean that internal memory 109, the system memory 110, and/or the internal memory 111 is non-movable or that its contents are static. As one example, the system memory 110 may be removed from the source device 102 and moved to another device. As another example, the system memory 110 may not be removable from the source device 102.

The processing unit 106 may be a central processing unit (CPU), a graphics processing unit (GPU), a general purpose GPU (GPGPU), or any other processing unit that may be configured to perform graphics processing. In some examples, the processing unit 106 may be integrated into a motherboard of the source device 102. In some examples, the processing unit 106 may be may be present on a graphics card that is installed in a port in a motherboard of the source device 102, or may be otherwise incorporated within a peripheral device configured to interoperate with the source device 102.

The processing unit 106 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 106 may store instructions for the software in a suitable, non-transitory computer-readable storage medium (e.g., internal memory 109), and may execute the instructions in hardware using one or more processors to perform the techniques of this disclosure. Any of the foregoing (including hardware, software, a combination of hardware and software, etc.) may be considered to be one or more processors.

The content encoder 108 may be any processing unit configured to perform content encoding. In some examples, the content encoder 108 may be integrated into a motherboard of the source device 102. The content encoder 108 may include one or more processors, such as one or more video processors, microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content encoder 108 may store instructions for the software in a suitable, non-transitory computer-readable storage medium (e.g., internal memory 111), and may execute the instructions in hardware using one or more processors to perform the techniques of this disclosure. Any of the foregoing (including hardware, software, a combination of hardware and software, etc.) may be considered to be one or more processors.

The communication interface 112 may include a receiver 114 and a transmitter 116. The receiver 114 may be configured to perform any receiving function described herein with respect to the source device 102. For example, the receiver 114 may be configured to receive information from the destination device 104, which may include a request for content. In some examples, in response to receiving the request for content, the source device 102 may be configured to perform one or more techniques described herein, such as produce or otherwise generate graphical content for delivery to the destination device 104. The transmitter 116 may be configured to perform any transmitting function described herein with respect to the source device 102. For example, the transmitter 116 may be configured to transmit encoded content to the destination device 104, such as encoded graphical content produced by the processing unit 106 and the content encoder 108 (i.e., the graphical content is produced by the processing unit 106, which the content encoder 108 receives as input to produce or otherwise generate the encoded graphical content). The receiver 114 and the transmitter 116 may be combined into a transceiver 118. In such examples, the transceiver 118 may be configured to perform any receiving function and/or transmitting function described herein with respect to the source device 102.

The destination device 104 may include one or more components configured to perform one or more techniques of this disclosure. In the example shown, the destination device 104 may include a processing unit 120, a content decoder 122, a system memory 124, a communication interface 126, and one or more displays 131. Reference to the display 131 may refer to the one or more displays 131. For example, the display 131 may include a single display or a plurality of displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 120 may include an internal memory 121. The processing unit 120 may be configured to perform video or graphics processing, such as in a graphics processing pipeline 107-2. The content decoder 122 may include an internal memory 123. In some examples, the destination device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display content that was generated using decoded content. For example, the display processor 127 may be configured to process one or more frames generated by the processing unit 120, where the one or more frames are generated by the processing unit 120 by using decoded content that was derived from encoded content received from the source device 102. In turn the display processor 127 may be configured to perform display processing on the one or more frames generated by the processing unit 120. The one or more displays 131 may be configured to display or otherwise present frames processed by the display processor 127. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content decoder 122, such as system memory 124, may be accessible to the processing unit 120 and the content decoder 122. For example, the processing unit 120 and the content decoder 122 may be configured to read from and/or write to external memory, such as the system memory 124. The processing unit 120 and the content decoder 122 may be communicatively coupled to the system memory 124 over a bus. In some examples, the processing unit 120 and the content decoder 122 may be communicatively coupled to each other over the bus or a different connection.

The content decoder 122 may be configured to receive graphical content from any source, such as the system memory 124 and/or the communication interface 126. The system memory 124 may be configured to store received encoded graphical content, such as encoded graphical content received from the source device 102. The content decoder 122 may be configured to receive encoded graphical content (e.g., from the system memory 124 and/or the communication interface 126) in the form of encoded pixel data. The content decoder 122 may be configured to decode encoded graphical content.

The internal memory 121, the system memory 124, and/or the internal memory 123 may include one or more volatile or non-volatile memories or storage devices. In some examples, internal memory 121, the system memory 124, and/or the internal memory 123 may include RAM, SRAM, DRAM, erasable programmable ROM (EPROM), electrically erasable programmable ROM (EEPROM), Flash memory, a magnetic data media or an optical storage media, or any other type of memory.

The internal memory 121, the system memory 124, and/or the internal memory 123 may be a non-transitory storage medium according to some examples. The term "non-transitory" may indicate that the storage medium is not embodied in a carrier wave or a propagated signal. However, the term "non-transitory" should not be interpreted to mean that internal memory 121, the system memory 124, and/or the internal memory 123 is non-movable or that its contents are static. As one example, the system memory 124 may be removed from the destination device 104 and moved to another device. As another example, the system memory 124 may not be removable from the destination device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the destination device 104. In some examples, the processing unit 120 may be may be present on a graphics card that is installed in a port in a motherboard of the destination device 104, or may be otherwise incorporated within a peripheral device configured to interoperate with the destination device 104.

The processing unit 120 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium (e.g., internal memory 121), and may execute the instructions in hardware using one or more processors to perform the techniques of this disclosure. Any of the foregoing (including hardware, software, a combination of hardware and software, etc.) may be considered to be one or more processors.

The content decoder 122 may be any processing unit configured to perform content decoding. In some examples, the content decoder 122 may be integrated into a motherboard of the destination device 104. The content decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content decoder 122 may store instructions for the software in a suitable, non-transitory computer-readable storage medium (e.g., internal memory 123), and may execute the instructions in hardware using one or more processors to perform the techniques of this disclosure. Any of the foregoing (including hardware, software, a combination of hardware and software, etc.) may be considered to be one or more processors.

The communication interface 126 may include a receiver 128 and a transmitter 130. The receiver 128 may be configured to perform any receiving function described herein with respect to the destination device 104. For example, the receiver 128 may be configured to receive information from the source device 102, which may include encoded content, such as encoded graphical content produced or otherwise generated by the processing unit 106 and the content encoder 108 of the source device 102 (i.e., the graphical content is produced by the processing unit 106, which the content encoder 108 receives as input to produce or otherwise generate the encoded graphical content). As another example, the receiver 114 may be configured to receive position information from the destination device 104, which may be encoded or unencoded (i.e., not encoded). Additionally, the receiver 128 may be configured to receive position information from the source device 102. In some examples, the destination device 104 may be configured to decode encoded graphical content received from the source device 102 in accordance with the techniques described herein. For example, the content decoder 122 may be configured to decode encoded graphical content to produce or otherwise generate decoded graphical content. The processing unit 120 may be configured to use the decoded graphical content to produce or otherwise generate one or more frames for presentment on the one or more displays 131. The transmitter 130 may be configured to perform any transmitting function described herein with respect to the destination device 104. For example, the transmitter 130 may be configured to transmit information to the source device 102, which may include a request for content. The receiver 128 and the transmitter 130 may be combined into a transceiver 132. In such examples, the transceiver 132 may be configured to perform any receiving function and/or transmitting function described herein with respect to the destination device 104.

The content encoder 108 and the content decoder 122 of content generation and coding system 100 represent examples of computing components (e.g., processing units) that may be configured to perform one or more techniques for encoding content and decoding content in accordance with various examples described in this disclosure, respectively. In some examples, the content encoder 108 and the content decoder 122 may be configured to operate in accordance with a content coding standard, such as a video coding standard, a display stream compression standard, or an image compression standard.

As shown in FIG. 1, the source device 102 may be configured to generate encoded content. Accordingly, the source device 102 may be referred to as a content encoding device or a content encoding apparatus. The destination device 104 may be configured to decode the encoded content generated by source device 102. Accordingly, the destination device 104 may be referred to as a content decoding device or a content decoding apparatus. In some examples, the source device 102 and the destination device 104 may be separate devices, as shown. In other examples, source device 102 and destination device 104 may be on or part of the same computing device. In some instances, a graphics processing pipeline may be distributed between the two devices. For example, a single graphics processing pipeline may include a plurality of video or graphics processes. The graphics processing pipeline 107-1 may include one or more video or graphics processes of the plurality of video or graphics processes. Similarly, graphics processing pipeline 107-2 may include one or more video or graphics processes of the plurality of video or graphics processes. In this regard, the graphics processing pipeline 107-1 concatenated or otherwise followed by the graphics processing pipeline 107-2 may result in a full video or graphics processing pipeline. Otherwise described, the graphics processing pipeline 107-1 may be a partial video or graphics processing pipeline and the graphics processing pipeline 107-2 may be a partial video or graphics processing pipeline that, when combined, result in an improved video or graphics processing pipeline.

Referring again to FIG. 1, in certain aspects, the graphics processing pipeline 107-2 may include a determination component 198 configured to determine a first subset of primitives of a set of primitives associated with a set of objects within an image, where the first subset of primitives can be based on a first viewpoint with respect to the set of objects. The determination component 198 can also be configured to determine for a second viewpoint with respect to the set of objects, a second subset of primitives of the set of primitives excluding the first subset of primitives. The second subset of primitives can have a difference in depth with respect to the first subset of primitives that is less than a threshold depth. Additionally, the determination component 198 can be configured to mark the first subset of primitives and the second subset of primitives as visible. Further, the determination component 198 can be configured to generate graphical content based on the marked first subset of primitives and the marked second subset of primitives. By distributing the graphics processing pipeline between the source device 102 and the destination device 104, the destination device may be able to, in some examples, present graphical content that it otherwise would not be able to render or present. Other example benefits are described throughout this disclosure.

As described herein, a device, such as the source device 102 and/or the destination device 104, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate graphical content, or any device configured to perform one or more techniques described herein.

Source device 102 may be configured to communicate with the destination device 104. For example, destination device 104 may be configured to receive encoded content from the source device 102. In some example, the communication coupling between the source device 102 and the destination device 104 is shown as link 134. Link 134 may comprise any type of medium or device capable of moving the encoded content from source device 102 to the destination device 104.

In the example of FIG. 1, link 134 may comprise a communication medium to enable the source device 102 to transmit encoded content to destination device 104 in real-time. The encoded content may be modulated according to a communication standard, such as a wireless communication protocol, and transmitted to destination device 104. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 102 to the destination device 104. In other examples, link 134 may be a point-to-point connection between source device 102 and destination device 104, such as a wired or wireless display link connection (e.g., a high definition multimedia interface (HDMI) link, a DisplayPort link, a Mobile Industry Processor Interface (MIPI) display serial interface (DSI) link, or another link over which encoded content may traverse from the source device 102 to the destination device 104.

In another example, the link 134 may include a storage medium configured to store encoded content generated by the source device 102. In this example, the destination device 104 may be configured to access the storage medium. The storage medium may include a variety of locally-accessed data storage media such as Blu-ray discs, DVDs, CD-ROMs, flash memory, or other suitable digital storage media for storing encoded content.

In another example, the link 134 may include a server or another intermediate storage device configured to store encoded content generated by the source device 102. In this example, the destination device 104 may be configured to access encoded content stored at the server or other intermediate storage device. The server may be a type of server capable of storing encoded content and transmitting the encoded content to the destination device 104.

Devices described herein may be configured to communicate with each other, such as the source device 102 and the destination device 104. Communication may include the transmission and/or reception of information. The information may be carried in one or more messages. As an example, a first device in communication with a second device may be described as being communicatively coupled to or otherwise with the second device. For example, a client device and a server may be communicatively coupled. As another example, a server may be communicatively coupled to a plurality of client devices. As another example, any device described herein configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices is inclusive of more than two devices. For example, a first device may communicatively couple with a second device and the first device may communicatively couple with a third device. In such an example, the first device may be a server.

With reference to FIG. 1, the source device 102 may be described as being communicatively coupled to the destination device 104. In some examples, the term "communicatively coupled" may refer to a communication connection, which may be direct or indirect. The link 134 may, in some examples, represent a communication coupling between the source device 102 and the destination device 104. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. For example, a device, such as the source device 102, may be configured to unicast, broadcast, multicast, or otherwise transmit information (e.g., encoded content) to one or more other devices (e.g., one or more destination devices, which includes the destination device 104). The destination device 104 in this example may be described as being communicatively coupled with each of the one or more other devices. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described herein, such as the source device 102 and the destination device 104, may be configured to operate in accordance with one or more communication protocols. For example, the source device 102 may be configured to communicate with (e.g., receive information from and/or transmit information to) the destination device 104 using one or more communication protocols. In such an example, the source device 102 may be described as communicating with the destination device 104 over a connection. The connection may be compliant or otherwise be in accordance with a communication protocol. Similarly, the destination device 104 may be configured to communicate with (e.g., receive information from and/or transmit information to) the source device 102 using one or more communication protocols. In such an example, the destination device 104 may be described as communicating with the source device 102 over a connection. The connection may be compliant or otherwise be in accordance with a communication protocol.

As used herein, the term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, or 5G.

With reference to FIG. 1, the content encoder 108 may be configured to encode video or graphical content. In some examples, the content encoder 108 may be configured to encode video or graphical content as one or more video frames. When the content encoder 108 encodes content, the content encoder 108 may generate a bitstream. The bitstream may have a bit rate, such as bits/time unit, where time unit is any time unit, such as second or minute. The bitstream may include a sequence of bits that form a coded representation of the video or graphical content and associated data. To generate the bitstream, the content encoder 108 may be configured to perform encoding operations on pixel data, such as pixel data corresponding to a shaded texture atlas. For example, when the content encoder 108 performs encoding operations on image data (e.g., one or more blocks of a shaded texture atlas) provided as input to the content encoder 108, the content encoder 108 may generate a series of coded images and associated data. The associated data may include a set of coding parameters such as a quantization parameter (QP).

In applications including computer graphics, there are many techniques and operations that are based on the visibility of images. For instance, this visibility can be based on a construct of geometric primitives. These geometric primitives can take on a variety of shapes, e.g., triangles. In some aspects, the visibility information pertaining to these geometric primitives can be based on a specific operation, e.g., a computer algorithm. Some aspects of computer graphics, e.g., virtual reality (VR), can utilize pixel or object shading, i.e., object space shading or decoupled shading, where reliable visibility information is important. With the increase in high frames rates to satisfy or smooth the VR experience, there is an increased need for a high number or density of shaded pixels within VR images. Combined with low latency requirements and larger field of view requirements, this desire for an increased pixel density can prove problematic for graphics cards.

In certain aspects of rendering a scene or image, primitive or triangle data can be rendered through the process of rasterization, which is sending a primitive or triangle data stream to a GPU to then generate the scene. Rendered primitives or triangles can then be sampled by the GPU following a raster. In some aspects, e.g., a decoupled rendering scenario, it can be desirable to move the camera a small amount. Also, the type of geometry needed for the movement can be determined, so the scene can still be rendered and all potential data can be covered that may be visible to a viewer. Further, the geometry for a certain viewpoint can be determined, such that the geometries for slightly different viewpoints can more easily be determined. Accordingly, a determination can be made regarding all the primitives or triangles for rendering in a certain viewpoint and slightly different viewpoints, which can be referred to as geometric aliasing. In some instances, this geometric determination can be referred to as a potentially visible set of primitives or triangles.

In some aspects of pixel or object shading, the shading information can be sampled based on the locations of geometric primitives. Sampling this visibility information from a scene or video can present a variety of potential difficulties, such as accounting for camera movement. For instance, shading or sampling primitives can become problematic when the visibility and the display does not use the same viewing parameters, i.e., if the camera parameters or resolution are not the same. For certain scenarios, e.g., VR, small viewpoint offsets between the visibility and display can reduce the display latency. Accordingly, it can be desirable to support camera adjustments between these stages. During visibility sampling, the sample locations from both the visibility and display may not match, which can lead to small primitives or triangles between sample locations viewed as holes in an image. Additionally, in some aspects of visibility information sampling, the primitives or triangles may be too small or large to be accounted for in a sampling grid. In these aspects, a large number of primitives or triangles may be erroneously discarded from the potentially visible set (PVS) of primitives. This can lead to a number of problems, such as the aforementioned holes or gaps in the corresponding generated image.

Figure 2B:
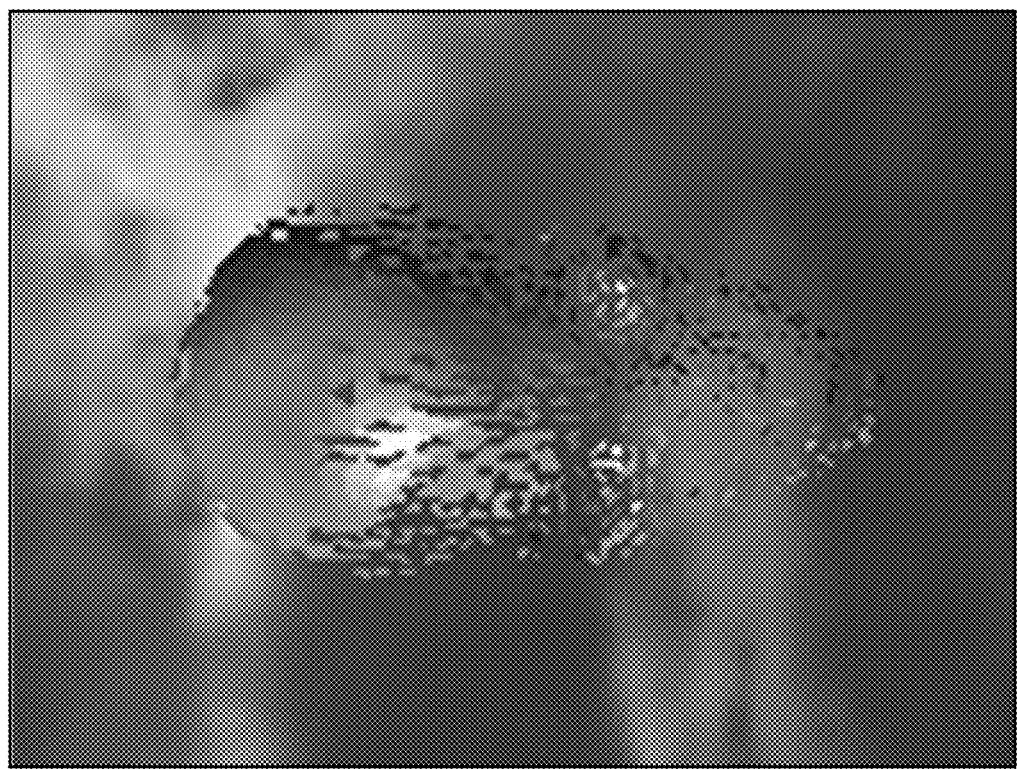
FIGS. 2A and 2B illustrate example images according to the present disclosure.
Figure 2A:
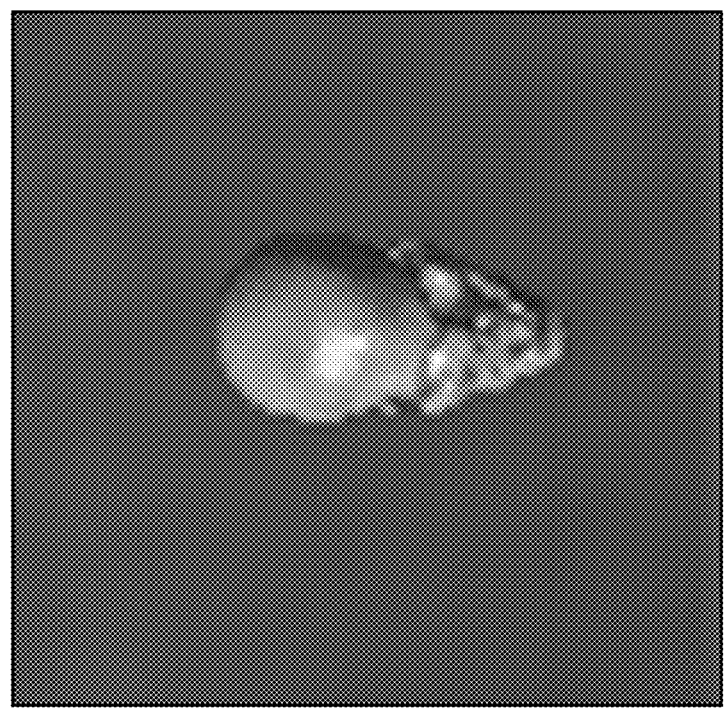

FIGS. 2A and 2B illustrate images 200 and 210, respectively, according to the present disclosure. FIG. 2A displays image 200 illustrating one viewpoint while shading triangles, i.e., a shading frame. As displayed in FIG. 2A, most of the primitives or triangles for this viewpoint are visible. Accordingly, there are very few holes or gaps in image 200. FIG. 2B displays image 210 illustrating a slightly different viewpoint, i.e., display frame, compared to image 200. Indeed, the primitives or triangles in image 210 are being sampled or shaded from a different orientation compared to image 200. As shown in FIG. 2B, this resulted in many more holes or gaps in image 210 compared to image 200. FIGS. 2A and 2B illustrate that if the camera is moved even slightly with standard primitive sampling resulting in a different viewpoint, there can be missing triangles or primitives that are visible in the image. As mentioned above, this can also be attributed to primitives or triangles that fell through the sampling grid while shading, which can result in inconsistencies or disocclusions when displaying the result from another viewpoint.

In some aspects of rendering, e.g., a decoupled rendering scenario, the primitive or triangle visibility for every pixel can be determined from a given viewpoint. In decoupled rendering, the shading frequency of primitives can be lower than display frequency. In some instances, several primitives or triangles within the area of one pixel can lead to unwanted artefacts under certain circumstances. For instance, as mentioned above, if subsequently rendered viewpoints are slightly different from the viewpoint where triangle visibility was determined, then only the front-most triangle that survived the depth test of the visibility pass may be visible. Further, small primitives or triangles may be missed during sampling. These missing triangles which should have been marked visible during sampling can show disocclusions.

As mentioned herein, visibility is an important aspect of computations in graphics processing and computer graphics pipelines, as these computations can focus on the displayed images. In some instances, anti-aliasing processes can assist the visibility determination by fighting aliasing, e.g., near the edges of an image or scene. Some aspects can do so by increasing the sampling per pixel. However, this can increase both the memory footprint and the run time. As such, it can be desirable to reduce the amount of sampling by decoupling the visibility sampling, e.g., in order to gather more information regarding scene depth.

As indicated above, decoupled rendering describes the idea that shader evaluation and image generation are run as separate passes, e.g., in a deferred rendering framework. Other object space shading methods can decide upfront what primitives to shade and therefore may decide what is visible when the output image is rendered. In some instances, a visibility determination can be used to enable efficient implementations on modern graphics hardware which makes sense for implementations such as real time VR rendering.

In some aspects of rendering a scene or image, draw calls for all of the primitives of all objects in a scene can be generated every frame. In some instances, only objects that are actually within the boundaries of the camera's field of view may be considered. In these instances, after the vertices have been transformed in the vertex processing stage, primitives or triangles are clipped against the viewing frustum. The triangles that survive the depth test can be rasterized and shaded. In contrast, in aspects that shade primitives or triangles for displaying at a later point, the process may be different and hence determine which primitives or triangles should be shaded and which should be ignored.

In some aspects, the process of visibility sampling can render the geometry of primitives with a render pipeline consisting of a vertex and a fragment shader. In these aspects, the identification of the primitive or triangle that invoked the fragment shader in a specific location of the render area can be saved. The triangle identification can also be determined by a running an index of invocations and an offset into the draw buffer that contains the primitives to be drawn. In some instances, once all draw calls for all visible models in the scene have been completed, the output texture to which all the draws have written may contain only the front-most triangle identification for every pixel, which can be referred to as the identification buffer. In some aspects, a second pass may be applied, which can gather the identifications from the two dimensional identification buffer into a one dimensional array of rendering primitives.

As indicated above, rasterization is the process of determining which cells of a grid of screen locations or pixels, i.e., the raster, are covered by a geometric primitive. In some instances, rasterization may consider a cell covered if the center overlaps with the primitive. In contrast, conservative rasterization may define any coverage of the cell as valid. For example, underestimation in conservative rasterization can report only those cells of the raster as covered that are overlapping and not touched by the edge of the primitive. Overestimation can mark all pixels as covered that are at least partially overlapping with the primitive.

Figure 3:
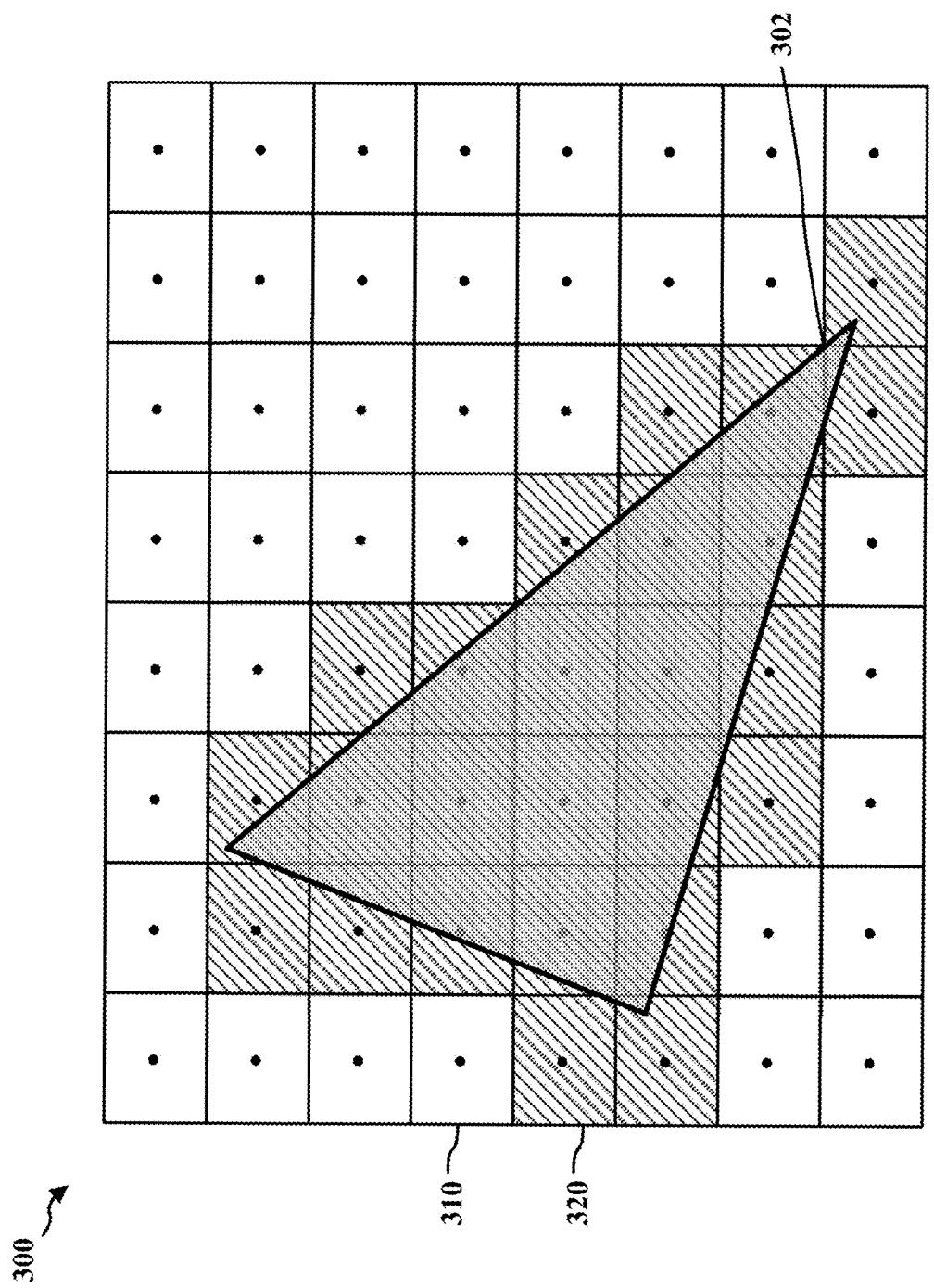
FIG. 3 illustrates an example of pixel marking according to the present disclosure.

FIG. 3 illustrates pixel marking 300 according to the present disclosure. Pixel marking 300 includes primitive or triangle 302, unmarked pixels 310, and marked pixels 320. As shown in FIG. 3, the conservative rasterization method utilized by pixel marking 300 marks pixels touched by triangle 302 as covered. These pixels can be referred to as marked pixels, e.g., marked pixels 320. The pixels that are not touched by triangle 302 can be referred to as unmarked pixels, e.g., unmarked pixels 310. As indicated above, this can be referred to as an overestimation process. As shown in FIG. 3, some aspects of the present disclosure can use an overestimation during conservative rasterization. In other aspects, some or only the pixels that are fully covered by a primitive or triangle may be marked, i.e., an underestimation.

As mentioned previously, geometric aliasing may lead to incorrect results when using rasterization or sampling to generate the exactly visible set (EVS) of primitives or triangles. In some instances, smaller primitives or triangles may not get sampled for a number of reasons, e.g., the primitives are small compared to the object space, they are small due to the projection, or there may be a small gap in a larger object in the front which may not be sampled.

The present disclosure can remedy the aforementioned sampling issues in a variety of manners. For instance, the present disclosure can sample the visibility of geometric primitives from a certain view point that also includes primitives that would otherwise fall in between sample locations. In these instances, the present disclosure can comprise two separate passes during sampling. The first pass can be referred to as a G-buffer pass and the second pass can utilize conservative rasterization to compare primitives with the G-buffer pass. The G-Buffer pass can obtain information concerning primitives at different sample locations. This can also be referred to as normal or straight forward pass, i.e., normal rasterization, and it can store information about all of the primitives or triangles that get sampled.

In some aspects, the second pass that utilizes conservative rasterization can use the information from the first or G-buffer pass. Using some heuristics, the present disclosure can determine primitives or triangles that would also be visible if the geometry is sampled in a different way or form a different viewpoint. As mentioned above, the conservative rasterization used during the second pass can allow the present disclosure to generate samples, e.g., in the fragment shader, for geometry that would not otherwise be sampled using the normal rasterization or first pass. This conservative rasterization can be useful in a number of situations, including for certainty in collision detection, occlusion culling, and/or visibility detection. As mentioned above, in some aspects of conservative rasterization every pixel in the raster that is touched by the rendered primitive or rasterization area can be rasterized or processed. In order to process the pixels, some aspects may invoke a pixel shader. In other aspects, only pixels that are completely covered may be processed.

In some instances, the primitives sampled from the first and the second passes can be determined as being from the same surface. After this comparison, if the primitives are identified as being from the same surface, they can be added to the visible set. The present disclosure can also propose heuristics that consider the depth differences and triangle sizes to identify primitives that are likely to correspond to the same surface. As indicated above, these heuristics can take the specifics of conservative rasterization into account. By dynamically adjusting the heuristics depending on the primitive or triangle properties, the present disclosure can provide a number of advantages, such as increasing the correct positive identification of primitives and reducing the incorrect or false negative classification or primitives. The present disclosure can also identify additional considerations, such as geometric relations of primitives, the distances between primitives, and any potential overlap between primitives to further increase the successful classification rate among different scenes or images. The present disclosure can solve the problem of pixel size gaps in scenes by introducing a pixel coverage measure and extending the approach to multiple passes, which can limiting any processing to only those pixels with gaps between them. The present disclosure can also compare the effectiveness by comparing to a fine grid sampling per pixel method that serves as a ground truth, i.e., essentially a list of the primitives or triangles for a certain orientation or viewpoint. Accordingly, the present disclosure can determine primitive or triangle visibility in a novel manner by using conservative rasterization and determine if they are visible in the context of decoupled shading.

Figure 4B:
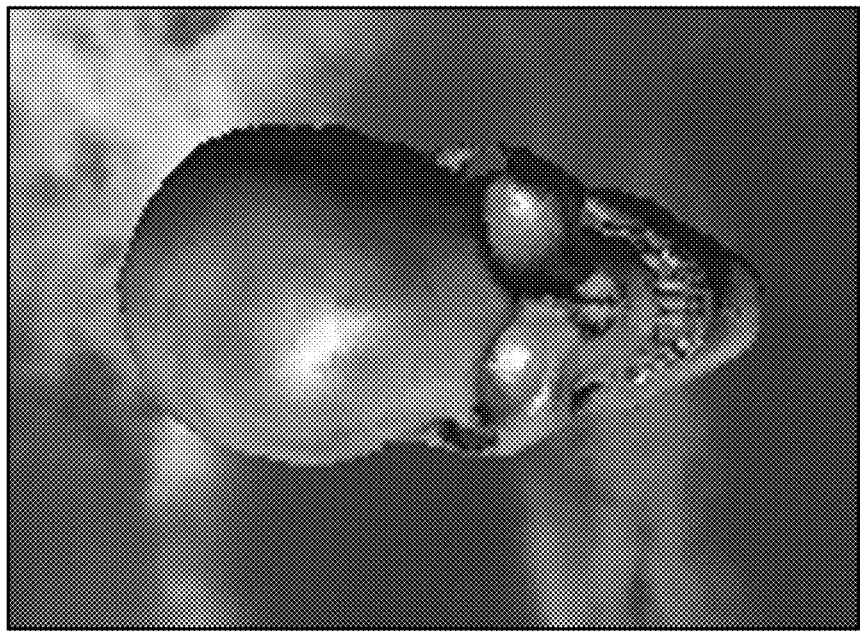
FIGS. 4A and 4B illustrate other example images according to the present disclosure.
Figure 4A:
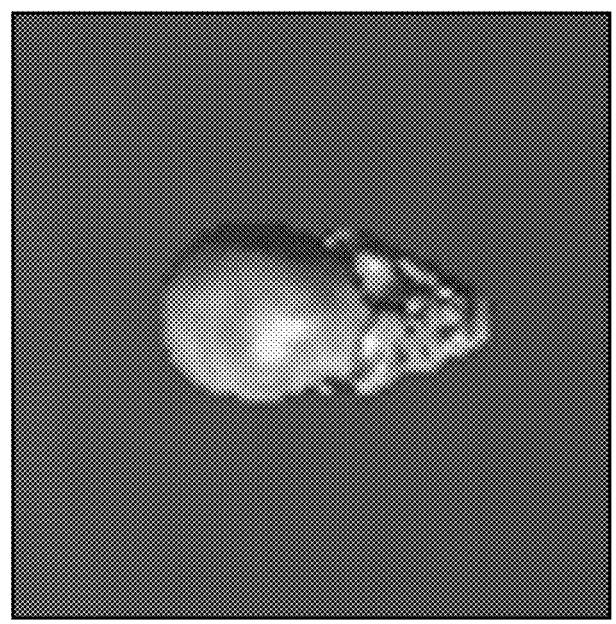

FIGS. 4A and 4B illustrate images 400 and 410, respectively, according to the present disclosure. More specifically, FIG. 4A shows image 400 from one viewpoint or orientation while shading triangles, i.e., a shading frame. FIG. 4B displays image 410 which is similar to image 400 except the triangles are shaded from a slightly different orientation or viewpoint, i.e., a display frame. In FIG. 4B, the aforementioned conservative rasterization process can be utilized. As shown in FIG. 4B, there are very few gaps or holes in the image. This is in contrast to FIG. 2B, which contains many gaps when the image orientation is slightly altered. Accordingly, the conservative rasterization process of the present disclosure can reduce the amount of holes or gaps in a different orientation of an image. Aspects of the present disclosure can capture the entire geometry of an image. For instance, additional triangles that may have previously been disregarded by the sampling grid may be shaded. Indeed, the present disclosure can add multiple triangles per sample. Hence, when the viewpoint of an image is slightly changed, the image may still appear to be intact, as opposed to missing a large amount of primitives or triangles.

Figure 5B:
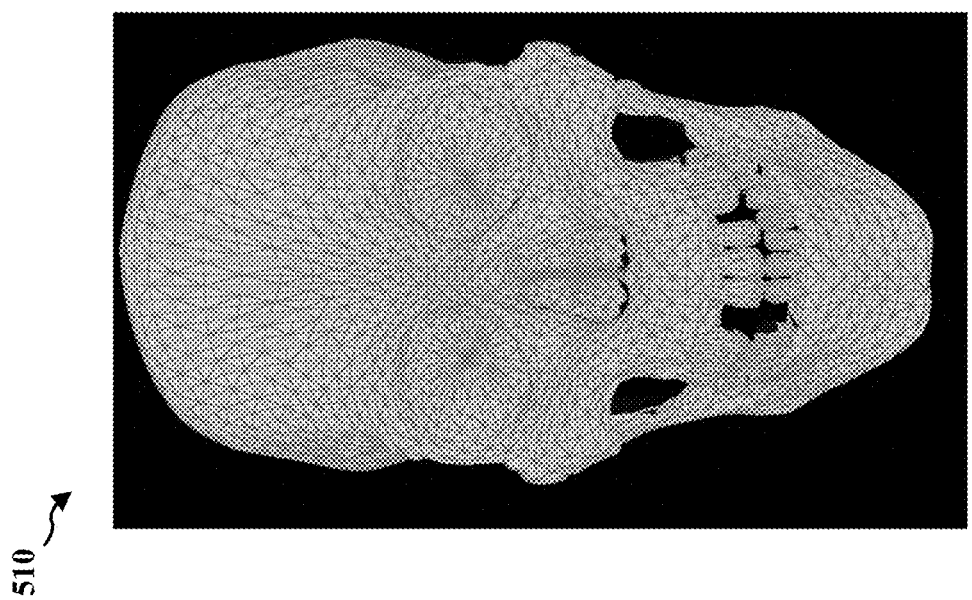
FIGS. 5A and 5B illustrate other example images according to the present disclosure.
Figure 5A:
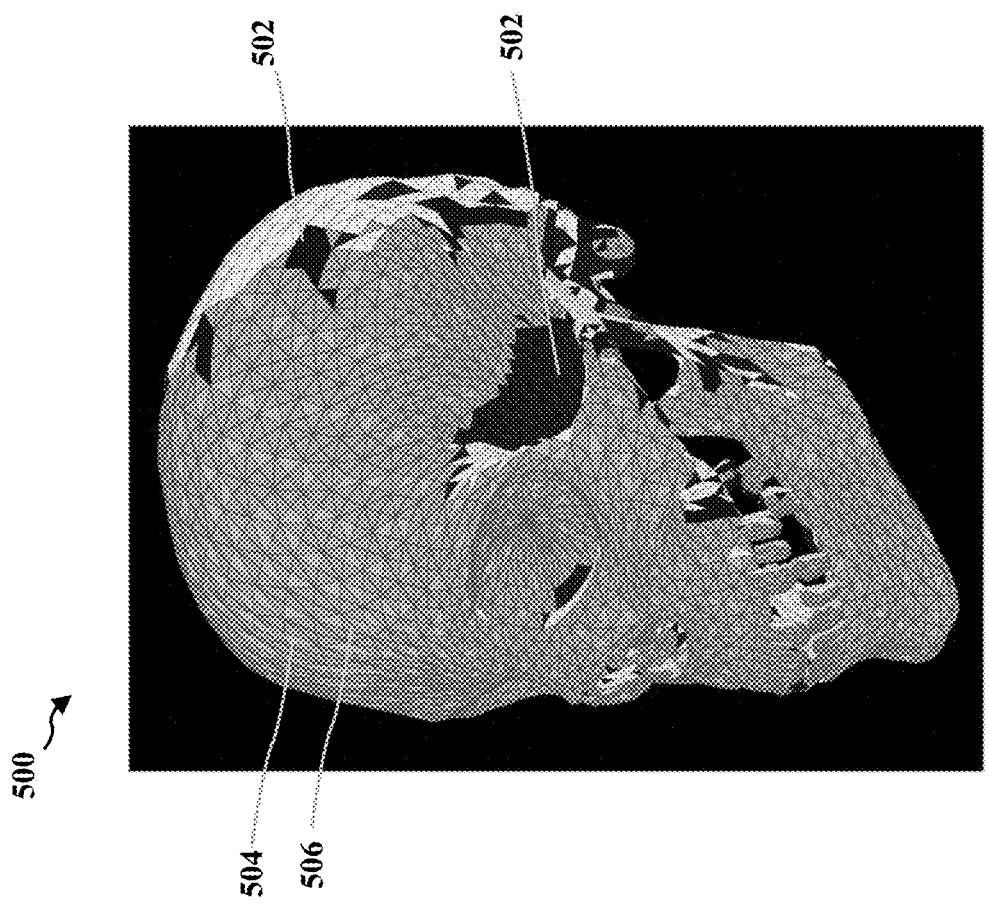

FIGS. 5A and 5B illustrate images 500 and 510, respectively, according to the present disclosure. More specifically, FIGS. 5A and 5B show a conservative rasterization visibility analysis being performed on images 500 and 510. As displayed in FIG. 5A, image 500 includes black primitives 502, light gray primitives 504, and dark gray primitives 506. Essentially, FIGS. 5A and 5B show visualization mapping of triangle visibility based on the G-buffer and conservative rasterization passes as mentioned here. In some aspects, black primitives 502 can represent primitives that are incorrectly or falsely identified. For example, black primitives 502 can be the result of either too much computation or possible disocclusion. Light gray primitives 504 can represent primitives that are detected with either standard and/or conservative sampling. Dark gray primitives 506 can represent primitives that are detected through only the conservative rasterization pass. Image 510 displayed in FIG. 5B is a different angle of the conservative rasterization visibility analysis being performed in on image 500. Both FIGS. 5A and 5B display that the present disclosure can significantly reduce the amount of incorrectly or falsely identified primitives.

In some aspects, if every triangle that is processed by the fragment shader stage in the conservative visibility pass was marked visible, a lot of false positives would be generated, which can cause unnecessarily high loads on the shading stage for triangles that may never be visible. With the help of information gathered in the first or G-buffer pass and settings which enable fine tuning to some degree, the present disclosure can formulate criteria on whether to keep or discard a triangle. For instance, the present disclosure can use a triangle identification, wherein if the triangle identification matches from the first pass, the triangle is accepted because it is the front-most triangle at the sampling point of the pixel. The present disclosure can also use an in-circle radius, wherein the triangle is discarded if the radius of the in-circle is larger than the size of a pixel. In some aspects, the in-circle radius can be represented with the following formula: $r=2A/(a+b+c)$, wherein r is the in-circle radius, A is the triangle area, and a/b/c are the side lengths of the triangle. Calculating the in-circle radius can help to ignore large triangles which should actually be occluded and may generate an unjustified high amount of shading work. The present disclosure can also compare the minimum and maximum depth of the triangle currently processed within the current fragment location and the same data of the triangle that was stored for this location from the first pass to calculate the absolute depth difference. Additionally, the present disclosure can track the coverage of each pixel by evaluating the area of the triangle that lies within the bounds of a pixel and then run another pass and only consider pixels not yet fully covered.

As mentioned above, the G-buffer or first pass can determine depth information of the triangles or primitives, the primitive identification, and the normal vector of the triangle. When determining the depth information, the present disclosure may not mark triangles as visible that are completely covered, for instance, as the depth of these triangles may be needed. For example, the present disclosure may want to determine the corresponding geometry so that triangles can be removed that may not become visible. If there is no depth information, then the present disclosure may not have any related information regarding the depth between the first pass and any subsequent passes. Essentially, the present disclosure can determine information about the depth of the triangles, e.g., the distance to camera. The G-buffer pass can also determine the primitive identification, which enables the present disclosure to determine which triangles are visible at a certain location and hence determine if multiple triangles are at the same depth. This can also help to clarify whether multiple triangles are at the same depth. Further, the G-buffer pass can determine the triangle normal vector value, which can allow the present disclosure to determine shape of the sampled surface, and hence allow the determination of potential depth differences within surface.

The present disclosure can also perform a conservative or second pass, e.g., after the G-buffer or first pass. As mentioned above, conservative rasterization can ensure that at least one sample is generated for every primitive or triangle, no matter the size of the primitive or triangle. Conservative rasterization can also help to determine visibility in fragment shader, i.e., a program that is run for every sample that is generated in conservative rasterization. In some aspects, the conservative or second pass can result in a lot more samples compared to the G-buffer or first pass. For instance, even if a triangle may only increase a pixel, rather than generating a new pixel, it can still generate a sample. In these instances, even if a triangle is barely touching a pixel, it can be added to be sampled. Moreover, some of the sample locations may potentially be outside of a primitive or triangle. Triangles nearly parallel to the viewing direction can also create a massive depth difference with the sampled triangle. Accordingly, limiting the depth calculation to a minimum and maximum depth of the triangle can help to limit the potential calculations.

In further aspects, the present disclosure can compare the triangle depth in conservative or second pass to the triangle depth in the G-buffer or first pass, e.g., if the difference is below threshold. This can indicate that the triangles are likely on the same surface, but just not sampled in the same manner. As such, the present disclosure can mark these triangles as visible. The present disclosure can also use additional factors to determine which triangles may be visible if the orientation or viewpoint is slightly different. In some instances, multiple large surfaces that are closely behind each other may create incorrect sampling results. In these instances, the present disclosure may only consider triangles in the second or conservative pass that are small along at least one edge of the triangle. Otherwise, these triangles may be sampled in the first or G-buffer pass. Indeed, the present disclosure can mark larger triangles as visible only when their primitive identification matches the G-buffer pass. Essentially, some aspects of the present disclosure may ignore larger triangles during one or more passes.

In summary, the present disclosure can sample triangles using a first or G-buffer pass. However, if the camera viewpoint is slightly altered, then there may be holes or gaps in the image. As a result, the present disclosure increases the sampling resolution to include a second or conservative pass. For instance, the present disclosure can take multiple samples instead of a single sample. Essentially, the present disclosure seeks to efficiently determine, e.g., at the server, which triangles might be visible if the user moves the camera slightly. Also, the present disclosure does not desire to merely take a high amount of samples, as this would be inefficient. The present disclosure is attempting to save or conserve performance data through the determination of triangles without over sampling and sacrificing performance. Accordingly, the present disclosure can determine triangles that may be visible if the viewpoint or orientation is slightly altered without any sacrifice in performance through over-sampling.

In some aspects, as a result of the aforementioned sampling passes, a list of all the triangles that may be visible for a certain orientation, i.e., a ground truth, can be calculated. For example, a ground truth can provide information regarding a certain image or orientation including small camera movements. In some instances, a ground truth can successfully identify all of the visible triangles, i.e., provide a map of all visible triangles. The present disclosure can seek to determine the visibility of the same triangles that the ground truth may determine. However, calculating the ground truth can result in massively over-sampling triangles and sacrificing performance. In contrast, the methods of the present disclosure can be faster and more efficient than the ground truth.

Aspects of the present disclosure can calculate the depth difference of primitives or triangles in a number of manners. For example, the present disclosure can calculate a static depth difference, which can determine a depth difference between the G-buffer pass and the conservative pass. In some instances, if the static depth difference is small, then it can be likely that the triangles are on the same surface. Accordingly, these triangles should be included in the potentially visible set. Additionally, the present disclosure can determine a dynamic depth difference, which can use slightly more information on the surface of the sample, such that the present disclosure can determine whether the triangles are on the same service. In some instances, determining the dynamic depth difference can consider the normal vector of conservatively rasterized triangles and/or the distance from a sampling point to a point on another primitive or triangle.

As indicated herein, the static depth difference can identify the depth of a primitive or triangle from the G-buffer or first pass and compare it to the depth of a primitive or triangle from the conservative or second pass. The static depth difference can be limited by bounding the static depth to the difference between a sampling point on a first pass triangle and an edge of a second pass triangle. In some aspects, this can be referred to as the static bounded depth, where the depth of the triangles is limited to the size of the triangle. Indeed, the static depth difference can be the difference in depth between the G-buffer or first pass triangle and the conservative or second pass triangle, where the depth is limited to the size of the triangle itself. The static depth can be bounded for a number of reasons, such as if the triangle get too rotated compared to one another, then the unbounded depth can be too deep. In some instances, the sampling point can be in the middle of the first pass triangle and the edge of a second pass triangle can be the closest point to the sampling point.

FIGS. 6A and 6B illustrate depth determination 600 and 650, respectively, according to the present disclosure. As shown in FIG. 6A, depth determination 600 includes first primitive 610, first normal vector 612, sampling point 614, second primitive 620, second normal vector 622, second primitive extension 624, first axis 630, bounded depth 632, and unbounded depth 634. FIG. 6B illustrates depth determination 650 which includes first primitive 660, first normal vector 662, sampling point 664, second primitive 670, second normal vector 672, second primitive extension 674, first axis 680, bounded depth 682, and unbounded depth 684.

In FIGS. 6A and 6B, the primitives 610/620/660/670 and their corresponding depths are being viewed from one side or edge. Accordingly, the camera is on top of the primitives 610/620/660/670 and looks down so they appear as a line. In some aspects, primitives 610/620/660/670 can be triangles, and when viewed from the top or side, they each appear as a line. In depth determination 600 shown in FIG. 6A, the first primitive 610 can be sampled in the G-buffer or first pass. Sampling point 614 is the point at which the first primitive 610 was sampled in the G-buffer or first pass. As shown in FIG. 6A, sampling point 614 can be in the middle of first primitive 610. Second primitive 620 can be sampled in the conservative or second pass. In some instances, second primitive 620 may have been too small to be sampled in the G-buffer or first pass. Accordingly, second primitive 620 can be sampled in the second or conservative pass through conservative rasterization. The present disclosure can gather information from the second primitive 620 and compare it with information from the first primitive 610 that was sampled in the first pass.

In some aspects, looking at the second primitive 620 from the side, the present disclosure can determine whether the depth of the second primitive 620 is in front of or behind the first primitive 610. Indeed, the conservative rasterization used in the conservative or second pass can provides a depth of the second primitive 620. The present disclosure can also limit or bound the depth of the second primitive 620 to the sized of the triangle, and then computing the difference of the limited range depth between the first primitive 610 and the second primitive 620. As shown in FIG. 6A, the static depth difference can be limited or bounded to be the difference between the sampling point 614 on the first primitive 610 and the closest point on the second primitive 620 to the sampling point 614. As shown in FIG. 6A, the closest point to sampling point 614 on the second primitive 620 is the far right edge of second primitive 620. As shown in FIG. 6A, the bounded depth 632 is calculated by determining the difference between the closest point to sampling point 614 on the second primitive 620, e.g., the far right edge of second primitive 620, and the sampling point 614.

In other aspects, the static depth difference can be unbounded, which can create a larger potential depth calculation between primitives or triangles. The unbounded static depth difference calculates the difference based on the axis based on an orientation from the original sample point on the first pass triangle and the extrapolated line extending from the second pass triangle. As shown in FIG. 6A, unbounded depth 634 is calculated by determining the difference between the sampling point 614 and the intersection of the first axis 630 and the second primitive extension 624 which extends from second primitive 620.

In some aspects, the first primitive 610 can be part of a first subset of primitives of a set of primitives that are determined by a GPU, where the set of primitive are associated with a set of objects within an image. The first subset of primitives can be based on a first viewpoint with respect to the set of objects. Also, the second primitive 620 can be part of a second subset of primitives of the set of primitives that are determined by a GPU for a second viewpoint with respect to the set of objects. In some aspects, the second subset of primitives can exclude the first subset of primitives. The second subset of primitives can have a difference in depth with respect to the first subset of primitives, e.g., that is less than a threshold depth. As shown in FIG. 6A, the second primitive 620 has as difference in depth, e.g., bounded depth 632 and unbounded depth 634, with respect to the first primitive 610. In some aspects, if the bounded depth 632 or unbounded depth 634 is less than a threshold, the GPU can mark the first subset of primitives including the first primitive 610 and the second subset of primitives including the second primitive 620 as visible. Further, the GPU can generate graphical content based on the marked first subset of primitives including the first primitive 610 and the marked second subset of primitives including the second primitive 620.

Additionally, the GPU can determine a size of primitives in the second subset of primitives including the second primitive 620. The GPU can also exclude primitives from the second subset of primitives including the second primitive 620 with a size greater than a threshold. In some aspects, the size can be an area of the primitive, e.g., the second primitive 620, or one or more edge lengths of the primitive, e.g., the second primitive 620. As further shown in FIG. 6A, the difference in depth between primitives in the first and second subsets of primitives, e.g., first primitive 610 and second primitive 620, can be determined based on a difference between a sampling point, e.g., sampling point 614, of a first primitive of the first subset of primitives and a point of a second primitive, e.g., second primitive 620, of the second subset of primitives closest to the sampling point.

FIG. 6B illustrates depth determination 650 which includes first primitive 660, first normal vector 662, sampling point 664, second primitive 670, second normal vector 672, second primitive extension 674, first axis 680, bounded depth 682, and unbounded depth 684. Depth determination 650 is similar to depth determination 600 but the primitives or triangles are in a different orientation. Indeed, first primitive 660 and second primitive 670 in FIG. 6B are rotated differently compared to first primitive 610 and second primitive 620 in FIG. 6A. As displayed in FIG. 6B, the bounded depth 682 is calculated by determining the difference between the closest point to sampling point 664 on the second primitive 670, e.g., the far right edge of second primitive 670, and the sampling point 664. The unbounded depth 684 is calculated by determining the difference between the sampling point 664 and the intersection of the first axis 680 and the second primitive extension 674 which extends from second primitive 670.

Aspects of the present disclosure can also compute the depth difference between primitives or triangles based on difference calculations. For instance, the present disclosure can calculate a dynamic depth difference, which can bound depth difference to the depth of the primitives or triangles within a certain length, e.g., one pixel. The present disclosure can also expand a differential or epsilon for the depth difference based on normal vector difference, i.e., it can take the relative angles of the primitives into account. The present disclosure can also store the normal vector of the triangle surface from a G-buffer pass, and when a conservatively rasterized triangle is sampled, the normals of the triangles can be compared. In some instances, if the normals of the two triangles are similar, then a large depth difference may not be needed as the triangles may form a surface that is flat or simply shaped. Indeed, in aspects where there are two triangles sampled, e.g., from a first and second pass, and they are oriented in a similar manner, then the image surface may be somewhat flat, so the triangles likely are from the same surface and they can be marked as visible. And the present disclosure may only consider a smaller depth difference because the two triangles are oriented in the same way. In other instances, if the normals of the triangles are far from one another, then they could be on a bumpy surface, and a larger depth difference can be considered. Accordingly, if the two triangles are on a rough or bumpy image surface, the orientations of the triangles may differ more, so the present disclosure can consider a larger depth difference to determine if the triangles are visible.

As indicated above, the dynamic depth difference can be an additional depth difference to be calculated, which can be scaled based on the normal vector difference of the first pass triangle and the second pass triangle. Indeed, this depth calculation is referred to as a dynamic depth difference because the depth can change dynamically based on the normal values of the triangles from difference passes. For example, the dynamic depth difference can be calculated using the dot product of the normal values of the triangles. In some aspects, the absolute value of the dot product of the triangles can be one if they are co-linear, and the dot product can be zero if they are perpendicular. For example, the dynamic depth difference can be calculated based on the following formulas:

$$\Delta_{eps} = \Delta_{abs} + \Delta_{dyn} * (1 - \text{abs}(\langle n_s, n_t \rangle))$$

$$\text{diff} = \begin{cases} d_{s,min} - d_{t,max} & \text{if } d_{s,min} > d_{t,max} \\ d_{t,min} - d_{s,max} & \text{if } d_{t,min} > d_{s,max} \\ 0 \end{cases}$$

If $\text{diff} < \Delta_{eps}$ then accept

As shown in the first formula above, the present disclosure can calculate an epsilon, $\Delta_{eps}$, based on a static parameter, $\Delta_{abs}$, and a dynamic parameter, $\Delta_{dyn}$, to compare the depth delta using the absolute value of the dot product of the triangles, $\text{abs}(\langle n_s, n_t \rangle)$, where $n_s$ and $n_t$ are the normalized triangle normal vectors. As shown in the second formula above, based on the minimum depth of the first triangle, $d_{s,min}$, the maximum depth of the first triangle, $d_{s,max}$, the minimum depth of the second triangle, $d_{t,min}$, and maximum depth of the second triangle, $d_{t,max}$, wherein the calculation is within a half pixel value on either side of the sampling point on the first triangle. By doing so, the present disclosure can calculate a depth delta or difference, diff. As shown in the third formula above, the present disclosure can discard or accept a primitive or triangle based on the comparison of the depth difference and the calculated epsilon.

Figure 7:
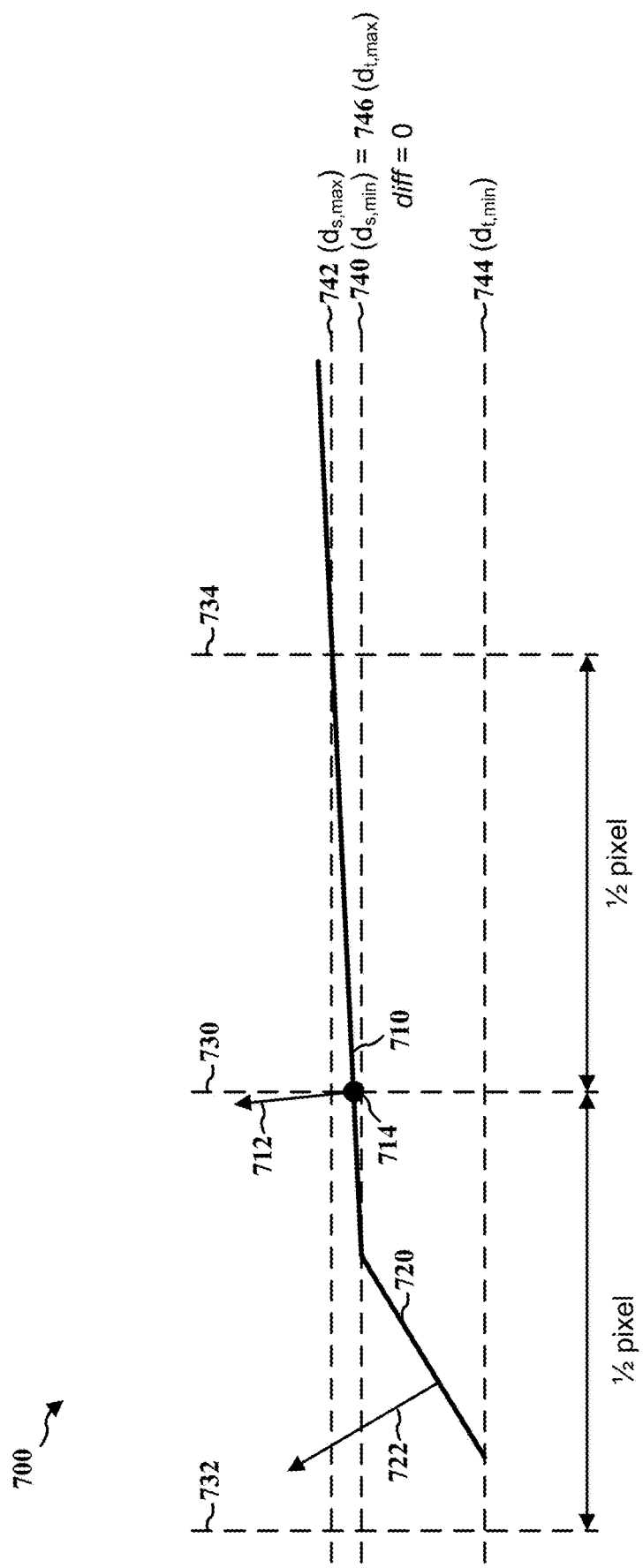
FIG. 7 illustrates another example of depth determination according to the present disclosure.

FIG. 7 illustrates depth determination 700 according to the present disclosure. As shown in FIG. 7, depth determination 700 includes first primitive 710, first normal vector 712, sampling point 714, second primitive 720, second normal vector 722, first axis 730, left axis 732, right axis 734, first minimum depth 740 ($d_{s,min}$), first maximum depth 742 ($d_{s,max}$), second minimum depth 744 ($d_{t,min}$), second maximum depth 746 ($d_{t,max}$). FIG. 7 displays that each primitive or triangle that is within a half pixel range around the sample location can be assigned to that sample location. For instance, second primitive 720 is within a half pixel range of sampling point 714 on first primitive 710, so both first primitive 710 and second primitive 720 may be assigned to the same sample location. In some aspects, it can be beneficial to limit the primitive depth values to within a single pixel, i.e., a half pixel on either side of the first pass triangle (e.g., first primitive 710), as the new triangles in the second pass (e.g., second primitive 720) are more likely to be visible if they are within one pixel surrounding the sampling point 714. For example, depth determination 700 can limit the primitives sampled to within a half pixel value of first axis 730 which runs through sampling point 714, i.e., the distance between left axis 732 and right axis 734. Accordingly, the present disclosure can limit the depth range to a half pixel on either side of the sampling point 714. In some aspects, the half pixel value can be a different value on either side of the sampling point 714, e.g., one pixel, two pixels, etc. In some instances, considering large triangles outside of a single pixel range may skew the estimates for visible triangles. As mentioned previously, the size of the sampled primitives or triangles can be limited.

As shown in FIG. 7, depth determination 700 includes the minimum depth of first primitive 710, e.g., first minimum depth 740 (also referred to as $d_{s,min}$), the maximum depth of first primitive 710 limited to the distance within a half pixel of sampling point 714, e.g., first maximum depth 742 (also referred to as $d_{s,max}$), the maximum depth of second primitive 720, e.g., second maximum depth 746 (also referred to as $d_{t,max}$), and the minimum depth of second primitive 720 limited to the distance within a half pixel of sampling point 714, e.g., second minimum depth 744 (also referred to as $d_{t,min}$). As further shown in FIG. 7, first minimum depth 740 can be equal to second maximum depth 746, such that the difference between $d_{s,min}$ and $d_{t,max}$, i.e., diff, is equal to zero.

The first primitive 710 can be part of a first subset of primitives of a set of primitives that are determined by a GPU, where the set of primitive are associated with a set of objects within an image. The first subset of primitives can be based on a first viewpoint with respect to the set of objects. Also, the second primitive 720 can be part of a second subset of primitives of the set of primitives that are determined by a GPU for a second viewpoint with respect to the set of objects. In some aspects, the second subset of primitives can exclude the first subset of primitives. The second subset of primitives can have a difference in depth with respect to the first subset of primitives, e.g., that is less than a threshold depth.

In some aspects, the determining the second subset of primitives can comprise determining a first primitive of the set of primitives excluding the first subset of primitives, e.g., second primitive 720, the first primitive being within a threshold distance of a sampling point 714 associated with a second primitive of the first subset of primitives, e.g., first primitive 710. The second primitive 720 can have a first point $d_{t,max}$ along one axis and a second point $d_{t,min}$ less than $d_{t,max}$ along the one axis. The first primitive 710 can have a first point $d_{s,max}$ along the one axis, e.g., right axis 734, and a second point $d_{s,min}$ less than $d_{s,max}$ along the one axis. Further, the GPU can determine whether a difference between $d_{s,min}$ and $d_{t,max}$ is less than the threshold depth, e.g., $\Delta_{eps}$, when $d_{s,min}$ is greater than $d_{t,max}$, and whether a difference between $d_{t,min}$ and $d_{s,max}$ is less than the threshold depth when $d_{t,min}$ is greater than $d_{s,max}$. As shown in FIG. 7, the difference between $d_{s,min}$ and $d_{t,max}$, diff, is equal to zero. Also, the GPU can include the second primitive 720 in the second subset of primitives when the difference is less than the threshold depth. Further, the threshold depth, e.g., $\Delta_{eps}$, can vary between a first threshold, $\Delta_{abs}$, and a second threshold, $\Delta_{abs}+\Delta_{dyn}$, based on an angle between normal vectors of the first and second primitives, e.g., first normal vector 712 and second normal vector 722, wherein $\Delta_{abs}$ and $\Delta_{dyn}$ are each greater than zero.

Figure 8:
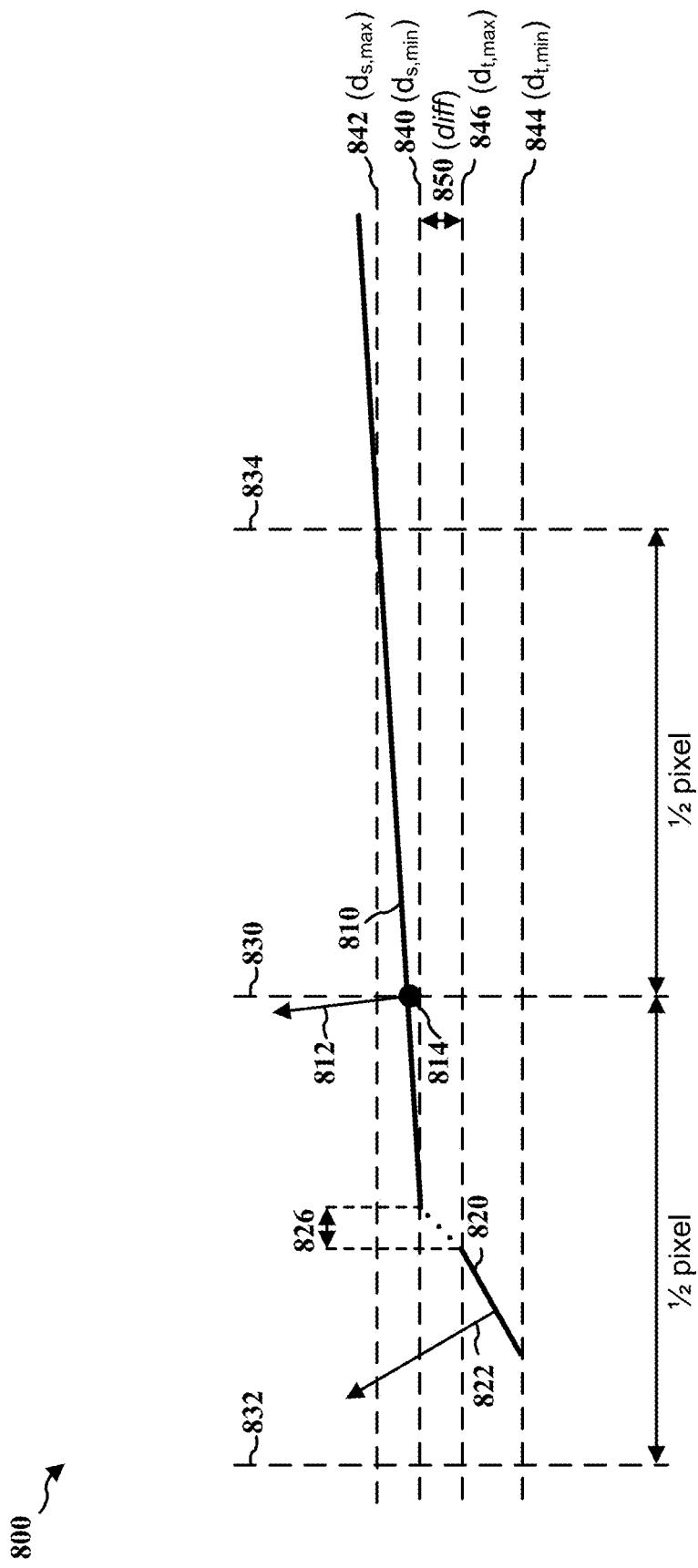
FIG. 8 illustrates another example of depth determination according to the present disclosure.

FIG. 8 illustrates depth determination 800 according to the present disclosure. As shown in FIG. 8, depth determination 800 includes first primitive 810, first normal vector 812, sampling point 814, second primitive 820, second normal vector 822, gap 826, first axis 830, left axis 832, right axis 834, first minimum depth 840 ($d_{s,min}$), first maximum depth 842 ($d_{s,max}$), second minimum depth 844 ($d_{t,min}$), second maximum depth 846 ($d_{t,max}$), and depth difference 850 (diff). Depth determination 800 in FIG. 8 is similar to depth determination 700 in FIG. 7, but the first primitive 810 and the second primitive 820 are slightly apart from one another by some distance, e.g., gap 826. Moreover, in depth determination 800, the difference between first minimum depth 840 ($d_{s,min}$) and second maximum depth 846 ($d_{t,max}$), e.g., depth difference 850 (diff), is greater than zero.

As shown in FIG. 8, the present disclosure seeks to determine the depth at the first sampled primitive during the G-buffer pass, e.g., first primitive 810, and determine a depth of a newly sampled primitive during the conservative pass, e.g., second primitive 820, and then calculate the difference between them. As mentioned herein, first primitive 810 has been sampling the entire range of the pixel, i.e., a half pixel range on either side of sampling point 814 and first axis 830, such that the range is from left axis 832 to right axis 834. By doing so, the present disclosure can determine information regarding the pixel and the entire depth range. Essentially, the present disclosure is determining the difference between the first pass triangle, e.g., first primitive 810, and the second pass triangle, e.g., second primitive 820. As indicated in the formulas above, the epsilon delta or threshold depth, $\Delta_{eps}$, can take into account both the absolute delta and the dynamic delta. In some instances, if the epsilon delta or threshold depth is larger than the depth difference 850, diff then the primitives are likely to come from the same surface and the present disclosure should accept the second primitive 820 into the second subset of primitives.

In other aspects the present disclosure can determine further depth calculations, e.g., a gap-based depth difference. The present disclosure can calculate how far apart the primitives or triangles are and then use that information to calculate which primitives or triangles should be included in the subset of primitives. For instance, the further the triangles are apart, then the larger the acceptance distance can be for the triangles. This calculation can also provide information regarding whether triangles are behind another triangle, such that they may not be visible. Accordingly, the present disclosure is adding a heuristic to determine the distance between triangles on either side of a gap.

In the gap-based depth difference calculation, the present disclosure can consider how far apart the first pass and second pass triangles are from each other. If they are far apart, then the present disclosure can allow for a larger depth difference. If the triangles are close together, then the present disclosure can allow for a smaller depth difference. So the gap-based depth difference calculation can adjust the allowed depth difference to the size of the gap between the sampled triangles. In order to do so, the present disclosure can save the sampling information from the G-buffer or first pass, e.g., depth range, half pixel range, size of triangle, etc. Then during the second pass, the present disclosure can compare the information and compute the distance between the triangles. Based on the distance between the triangles, the threshold depth, e.g., $\Delta_{eps}$, can be calculated.

The gap-based depth difference calculation is essentially a scaling of the dynamic depth computation based on additional gap information. So the delta values can be scaled with the gap distance, e.g., a bigger gap results in a larger delta value. By scaling the allowed depth difference with the gap distance between the triangles, the present disclosure can provide an improved heuristic. Similar to other depth calculations herein, the gap-based depth difference can be calculated based on the following formulas:

$$\Delta_{eps} = \Delta_{abs} + \Delta_{dyn} * (1 - \text{abs}(\langle n_s, n_t \rangle))$$

$$\text{diff} = \begin{cases} d_{s,min} - d_{t,max} & \text{if } d_{s,min} > d_{t,max} \\ d_{t,min} - d_{s,max} & \text{if } d_{t,min} > d_{s,max} \\ 0 \end{cases}$$

If $\text{diff} < \Delta_{eps}$ then accept

In some instances, $\Delta_{dyn}$ can be a user defined value that can change based on the gap size. For instance, $\Delta_{dyn}$ can be an arbitrary non-zero value. If $\Delta_{dyn}$ is scaled with the gap size, and the triangles are touching such that the gap size is zero, then $\Delta_{dyn}$ can be a small arbitrary value. The present disclosure can also set $\Delta_{dyn}$ to consider the slope or normal of triangle $n_t$ in comparison to the viewpoint or orientation direction, which can fill up gap. In further aspects, the present disclosure can average the slope of the two triangles and essentially approximate the surface in between the triangles. In these aspects, there may be a requirement to store plane equations in the G-Buffer pass in order to compute the gap size.

Figure 9:
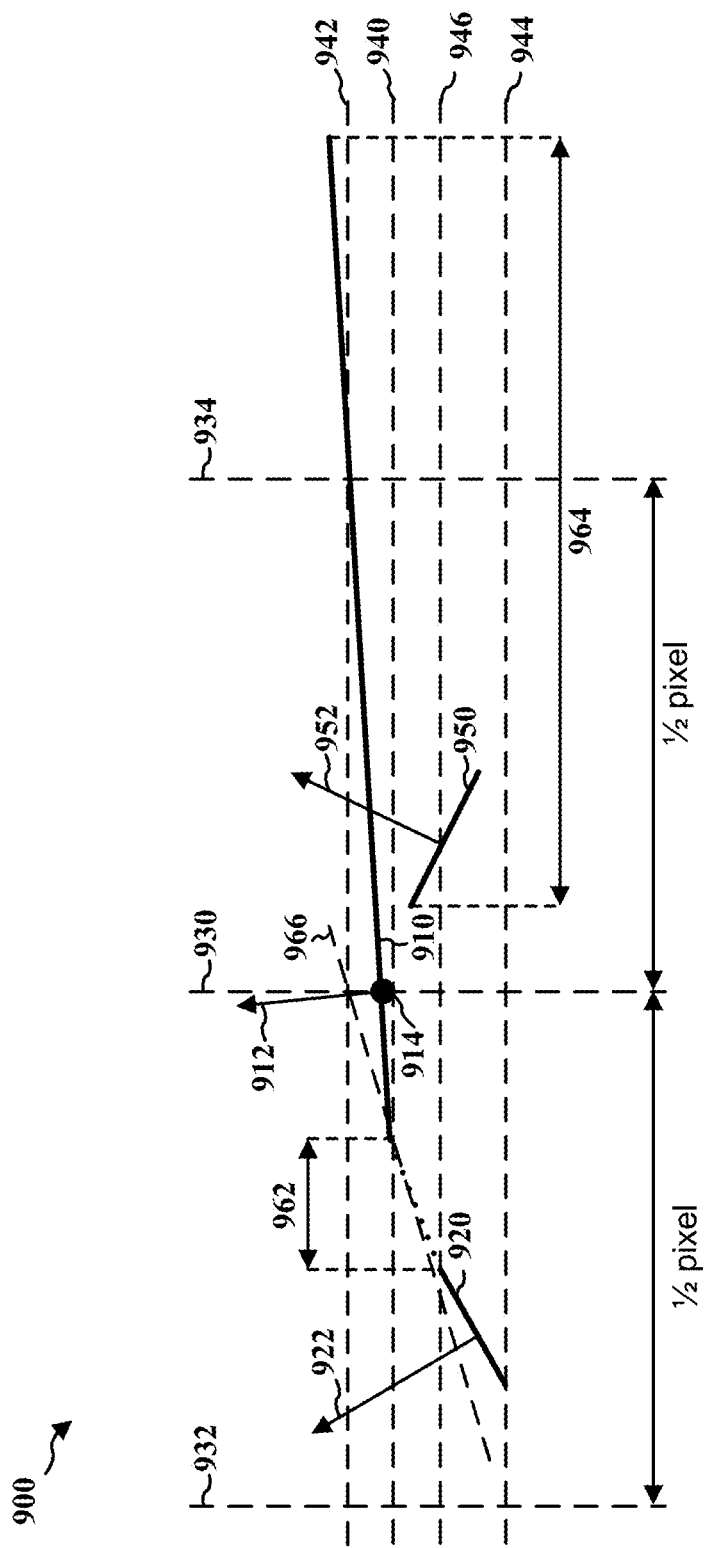
FIG. 9 illustrates another example of depth determination according to the present disclosure.

FIG. 9 illustrates depth determination 900 according to the present disclosure. As shown in FIG. 9, depth determination 900 includes first primitive 910, first normal vector 912, sampling point 914, second primitive 920, second normal vector 922, first axis 930, left axis 932, right axis 934, first minimum depth 940 ($d_{s,min}$), first maximum depth 942 ($d_{s,max}$), second minimum depth 944 ($d_{t,min}$), second maximum depth 946 ($d_{t,max}$), third primitive 950, third normal vector 952, first gap length 962, second gap length 964, and first gap slope 966. As shown in FIG. 9, depth determination 900 can calculate the aforementioned gap-based depth difference. In some instances, first gap slope 966 can be the average of the slope in the gap including first gap length 962, e.g., the slope between the end points of the first primitive 910 and the second primitive 920.

The first primitive 910 can be part of a first subset of primitives of a set of primitives that are determined by a GPU, where the set of primitive are associated with a set of objects within an image. The first subset of primitives can be based on a first viewpoint with respect to the set of objects. Also, the second primitive 920 can be part of a second subset of primitives of the set of primitives that are determined by a GPU for a second viewpoint with respect to the set of objects. In some aspects, the second subset of primitives can exclude the first subset of primitives. The second subset of primitives can have a difference in depth with respect to the first subset of primitives, e.g., that is less than a threshold depth. The GPU can determining a gap with a gap length, e.g., first gap length 962, between the first primitive and the second primitive. The GPU can also increase $\Delta_{dyn}$ by scaling $\Delta_{dyn}$ up based on the determined gap length, e.g., first gap length 962. In some aspects, if the primitive extends outside of the pixel, this can help to avoid incorrect or false calculations, e.g., which may be known due to plane equations.

The present disclosure can also include further depth calculations based on gaps. For instance, if there is a gap between sampled triangles from the first and second passes, there can be a way to look through the two primitives to determine if there are any primitives in the gap. So the present disclosure can mark section including the gap between the triangles as visible. In some instances, this depth calculation can be referred to as a through gap calculation. However, if the triangles in the gap are far away, then they may be incorrectly marked as visible. Accordingly, the present disclosure can determine if there is a gap after sampling all the primitives.

Figure 10:
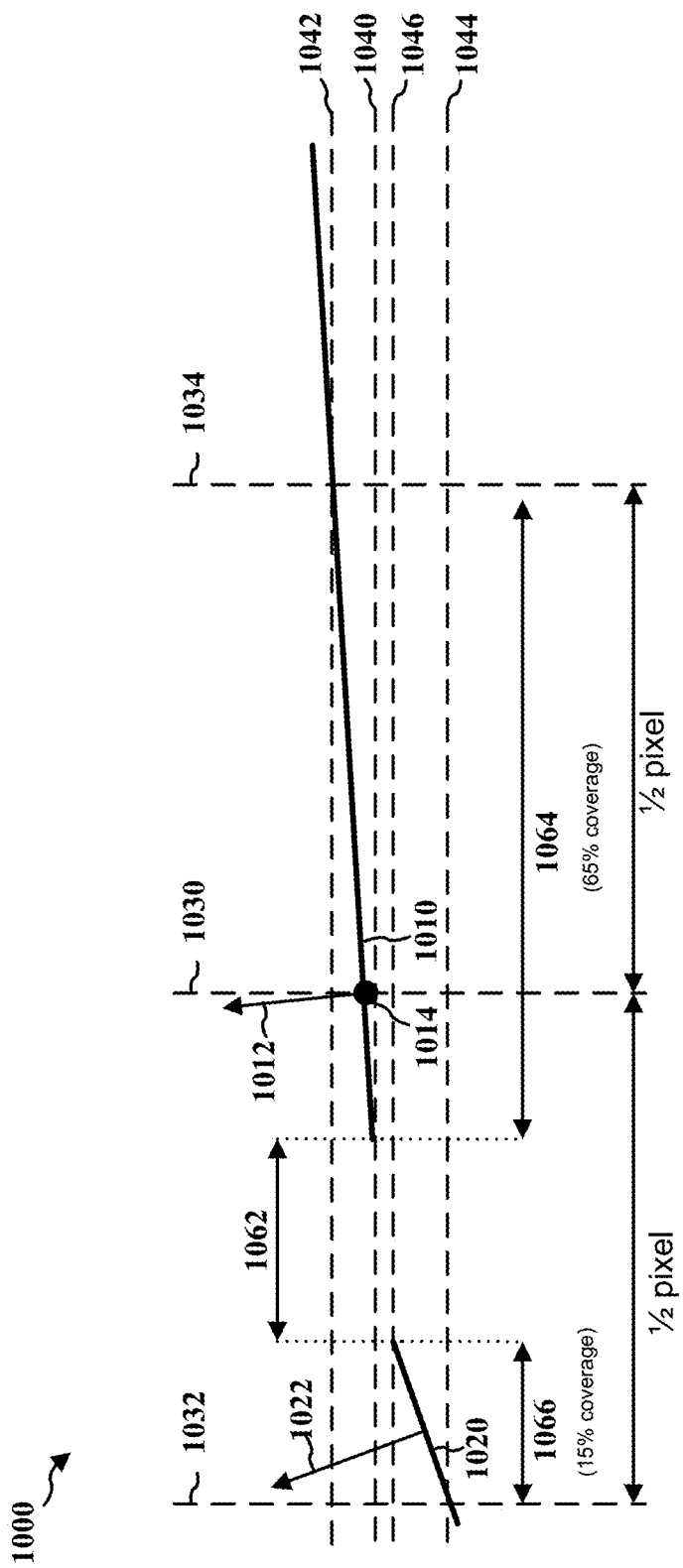
FIG. 10 illustrates another example of depth determination according to the present disclosure.

FIG. 10 illustrates depth determination 1000 according to the present disclosure. As shown in FIG. 10, depth determination 1000 includes first primitive 1010, first normal vector 1012, sampling point 1014, second primitive 1020, second normal vector 1022, first axis 1030, left axis 1032, right axis 1034, first minimum depth 1040 ($d_{s,min}$), first maximum depth 1042 ($d_{s,max}$), second minimum depth 1044 ($d_{t,min}$), second maximum depth 1046 ($d_{t,max}$), gap length 1062, first coverage 1064, and second coverage 1066. In some instances, depth determination 1000 can be a through gap calculation.

Depth determination 1000 can determine the coverage area of the pixel from the first primitive 1010, e.g., 65% coverage, and the second primitive 1020, e.g., 15% coverage. If the coverage areas of the two triangles do not add up to 100%, then the present disclosure can determine that there is a gap between the triangles, e.g., gap length 1062. As shown in FIG. 10, the gap length 1062 can make up 20% of the pixel coverage, as the first primitive 1010 and the second primitive 1020 combine to make up 80% of the pixel coverage. In some aspects, the present disclosure can re-run passes for the pixels that have not yet reached 100% coverage, i.e., passes can be run until 100% coverage is reached for all pixels. In instances with a gap between primitives, the present disclosure can also accept a surface in the gap and behind the primitives as visible. Accordingly, the present disclosure can add up the first pass triangles and the second pass triangles and determine if there is a gap between these triangles, and continue re-sampling until the gap size is determined or triangles are selected that can fill the gap. In some aspects, the present disclosure may go through both the first and second passes before the gap sizes are determined. However, the second and subsequent passes can be more efficient as fewer and fewer triangles are being marked as visible. Thus, the present disclosure may not need to perform a full additional pass, as another pass can be run in the gap periods.

As mentioned herein, during subsequent passes the present disclosure can iterate through the remaining triangles to determine which are in the second set, and then the coverage percentages can be added to determine a gap coverage size. If there is a gap, the present disclosure can mark the triangles that are in the gap, and re-run the sampling algorithm to mark any potentially visible triangles in the gap. In some aspects, the present disclosure may only be concerned with the gaps in a particular orientation or viewpoint. Then it can be determined if there is a gap based on the current orientation or viewpoint. So the through gap calculation can calculate triangles based on certain pixel areas in the viewpoint and then determine the corresponding gaps. In some aspects, the present disclosure can run these samples in parallel at a GPU, so it may be easier to perform these passes based on pixels, rather than based on the edges of the individual triangles. In some instances, small gaps may need to be sampled in order to reveal any geometry behind them. Also, by tracking the coverage of each pixel, the present disclosure can perform a depth pealing pass, where the approach is re-run for pixels that are not yet 100% covered and only render geometry not yet marked as visible. Further, in some aspects, the coverage can be computed from the edge equations during the conservative rasterization, e.g., at the fragment shader.

FIG. 10 illustrates that depth determination 1000 can keep track of coverage area for primitives, e.g., first primitive 1010 and second primitive 1020, within a pixel. As mentioned previously, if the coverage areas of the primitives do not add up to 100%, then depth determination 1000 can determine that there is a gap between the triangles. Also, depth determination 1000 perform a multi-pass approach, so for all the pixels that have been determined to include a gap between triangles, more iterations can be run. Further, depth determination 1000 can perform the same approach again for different passes, as well as limit the passes to pixels that have a gap, i.e., coverage does not add up to 100%, in order to save on costs and performance data.

As indicated herein, the first primitive 1010 can be part of a first subset of primitives that are determined by a GPU. Additionally, the second primitive 1020 can be part of a second subset of primitives that are determined by a GPU. The GPU can determining a gap with a gap length, e.g., gap length 1062, between the first primitive 1010 and the second primitive 1020. The GPU can also increase $\Delta_{dyn}$ by scaling $\Delta_{dyn}$ up based on the determined gap length, e.g., gap length 1062. The GPU can also determine a sample point, e.g., sampling point 1014 along one axis closest to the gap. Further, GPU can determine primitives within the set of primitives excluding the first subset of primitives that are behind the first and second primitives 1010 and 1020 with respect to a second viewpoint and are within at least partially the threshold distance from the sampling point 1014 along the one axis. Also, the GPU can include the determined primitives within the second subset of primitives.

Figure 11:
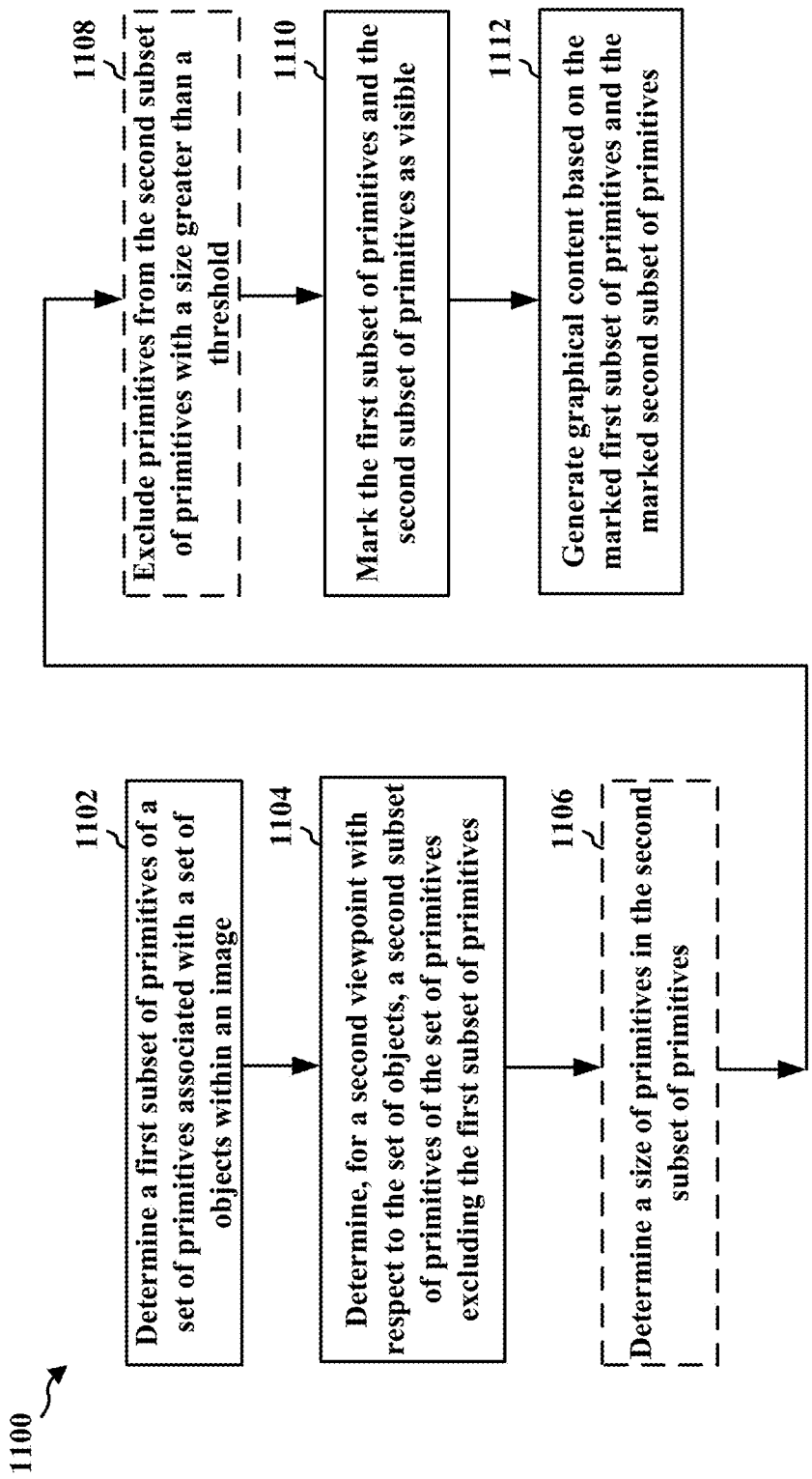
FIG. 11 illustrates an example flowchart of an example method in accordance with one or more techniques of this disclosure.

FIG. 11 illustrates an example flowchart 1100 of an example method in accordance with one or more techniques of this disclosure. The method may be performed by a GPU or apparatus for graphics processing. At 1102, the apparatus may determine a first subset of primitives of a set of primitives associated with a set of objects within an image, as described in connection with the examples in FIGS. 6A, 6B, 7, 8, 9, and 10. For example, as described in the example in FIG. 6A, a GPU can determine a first subset of primitives of a set of primitives associated with a set of objects within an image, e.g., first primitive 610. The first subset of primitives can based on a first viewpoint with respect to the set of objects, as described in connection with the examples in FIGS. 6A, 6B, 7, 8, 9, and 10. At 1104, the apparatus may determine, for a second viewpoint with respect to the set of objects, a second subset of primitives of the set of primitives excluding the first subset of primitives. For example, as described in the example in FIG. 6A, the GPU can determine, for a second viewpoint with respect to the set of objects, a second subset of primitives of the set of primitives excluding the first subset of primitives, e.g., second primitive 620. In some aspects, the second subset of primitives may have a difference in depth with respect to the first subset of primitives that is less than a threshold depth, as described in FIGS. 6A, 6B, 7, 8, 9, and 10.

At 1106, the apparatus may determine a size of primitives in the second subset of primitives, as described in connection with the examples in FIGS. 6A, 6B, 7, 8, 9, and 10. At 1108, the apparatus can exclude primitives from the second subset of primitives with a size greater than a threshold, as described in connection with the examples in FIGS. 6A, 6B, 7, 8, 9, and 10. The size of the primitives can be at least one of an area of the primitive or one or more edge lengths of the primitive, as described in connection with the examples in FIGS. 6A, 6B, 7, 8, 9, and 10. Moreover, the difference in depth between primitives in the first and second subsets of primitives can be determined based on a difference between a sampling point of a first primitive of the first subset of primitives and a point of a second primitive of the second subset of primitives closest to the sampling point, as described in connection with the examples in FIGS. 6A and 6B.

In some aspects, the determining the second subset of primitives can comprise determining a first primitive of the set of primitives excluding the first subset of primitives, the first primitive being within a threshold distance of a sampling point associated with a second primitive of the first subset of primitives, as described in connection with the examples in FIGS. 7 and 8. Also, the first primitive can have a first point $d_{t,max}$ along one axis and a second point $d_{t,min}$ less than $d_{t,max}$ along the one axis, the second primitive having a first point $d_{s,max}$ along the one axis and a second point $d_{s,min}$ less than $d_{s,max}$ along the one axis, as described in connection with the examples in FIGS. 7 and 8. For example, as described in connection with FIG. 7, the second primitive 720 can have a first point $d_{t,max}$ along one axis and a second point $d_{t,min}$ less than $d_{t,max}$ along the one axis, and the first primitive 710 can have a first point $d_{s,max}$ along the one axis and a second point $d_{s,min}$ less than $d_{s,max}$ along the one axis. Further, the determining the second subset of primitives can comprise determining whether a difference between $d_{s,min}$ and $d_{t,max}$ is less than the threshold depth when $d_{s,min}$ is greater than $d_{t,max}$, and whether a difference between $d_{t,min}$ and $d_{s,max}$ is less than the threshold depth when $d_{t,min}$ is greater than $d_{s,max}$, as described in connection with the examples in FIGS. 7 and 8. Also, the determining the second subset of primitives can comprise including the first primitive in the second subset of primitives when the difference is less than the threshold depth, as described in connection with the examples in FIGS. 7 and 8. In some aspects, the threshold depth can vary between a first threshold $\Delta_{abs}$ and a second threshold $\Delta_{abs}+\Delta_{dyn}$ based on an angle between normal vectors of the first and second primitives, wherein $\Delta_{abs}$ and $\Delta_{dyn}$ are each greater than zero, as described in connection with the examples in FIGS. 7 and 8.

Additionally, the apparatus can determine a gap with a gap length between the first primitive and the second primitive, as described in connection with the examples in FIGS. 9 and 10. Further, the apparatus can increase $\Delta_{dyn}$ by scaling $\Delta_{dyn}$ up based on the determined gap length, as described in connection with the examples in FIGS. 9 and 10. In some aspects, the apparatus can determine a sample point along one axis closest to the gap, as described in connection with the examples in FIGS. 9 and 10. Also, the apparatus can determine primitives within the set of primitives excluding the first subset of primitives that are behind the first and second primitives with respect to the second viewpoint and are within at least partially the threshold distance from the sampling point along the one axis, as described in connection with the examples in FIGS. 9 and 10. In addition, the apparatus can include the determined primitives within the second subset of primitives, as described in connection with the examples in FIGS. 9 and 10.

In some instances, the determining the second subset of primitives of the set of primitives excluding the first subset of primitives can comprise determining, for each primitive in the set of primitives excluding the first subset of primitives, during a conservative rasterization process the difference in depth between the primitive and a closest primitive of the first subset of primitives, as described in connection with the examples in FIGS. 6A, 6B, 7, 8, 9, and 10. The determining the second subset of primitives of the set of primitives excluding the first subset of primitives can also comprise including the primitive in the second subset of primitives upon determining the difference in depth between the primitive and the closest primitive of the first subset of primitives is less than the threshold depth, as described in connection with the examples in FIGS. 6A, 6B, 7, 8, 9, and 10.

At 1110, the apparatus can mark the first subset of primitives and the second subset of primitives as visible, as described in connection with the examples in FIGS. 6A, 6B, 7, 8, 9, and 10. Additionally, at 1112, the apparatus can generate graphical content based on the marked first subset of primitives and the marked second subset of primitives, as described in connection with the examples in FIGS. 6A, 6B, 7, 8, 9, and 10.

In one configuration, a method or apparatus for operation of a GPU is provided. The apparatus may be a GPU or some other processor in graphics processing. In one aspect, the apparatus may be the processing unit 120 within the device 104, the processing unit 106 within the device 102, or may be some other hardware within devices 102/104 or another device. The apparatus may include means for determining a first subset of primitives of a set of primitives associated with a set of objects within an image, wherein the first subset of primitives is based on a first viewpoint with respect to the set of objects. The apparatus can also include means for determining, for a second viewpoint with respect to the set of objects, a second subset of primitives of the set of primitives excluding the first subset of primitives, the second subset of primitives having a difference in depth with respect to the first subset of primitives that is less than a threshold depth. Further, the apparatus can include means for marking the first subset of primitives and the second subset of primitives as visible. Also, the apparatus can include means for generating graphical content based on the marked first subset of primitives and the marked second subset of primitives. In some aspects, the apparatus can include means for determining a size of primitives in the second subset of primitives. The apparatus can also include means for excluding primitives from the second subset of primitives with a size greater than a threshold. Additionally, the apparatus can include means for determining a gap with a gap length between the first primitive and the second primitive. Moreover, the apparatus can include means for increasing $\Delta_{dyn}$ by scaling $\Delta_{dyn}$ up based on the determined gap length. In some aspects, the apparatus can include means for determining a sample point along one axis closest to the gap. The apparatus can also include means for determining primitives within the set of primitives excluding the first subset of primitives that are behind the first and second primitives with respect to the second viewpoint and are within at least partially the threshold distance from the sampling point along the one axis. Further, the apparatus can include means for including the determined primitives within the second subset of primitives.

The subject matter described herein can be implemented to realize one or more benefits or advantages. For instance, the described graphics processing techniques can be used GPUs or other graphics processors to increase the correct positive identification of primitives and reduce the incorrect or false negative classification or primitives. For example, the present disclosure can improve the accuracy of primitive identification. By doing so, the present disclosure can reduce the amount of cost or effort to run the processing calculations. Indeed, the present disclosure can save time, effort, and costs by utilizing the aforementioned graphs processing calculations.

In accordance with this disclosure, the term "or" may be interpreted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
    determining a first subset of primitives of a set of primitives associated with a set of objects within an image, wherein the first subset of primitives is based on a first viewpoint with respect to the set of objects;
    determining, for a second viewpoint with respect to the set of objects, a second subset of primitives of the set of primitives excluding the first subset of primitives, the second subset of primitives having a difference in depth less than a threshold depth with respect to the first subset of primitives;
    determining a size of primitives in the second subset of primitives;
    marking the first subset of primitives and the second subset of primitives as visible; and
    generating graphical content based on the marked first subset of primitives and the marked second subset of primitives.

2. The method of claim 1, further comprising:
    excluding primitives from the second subset of primitives with a size greater than a threshold.

3. The method of claim 2, wherein the size is at least one of an area of the primitive or one or more edge lengths of the primitive.

4. The method of claim 1, wherein the difference in depth between primitives in the first and second subsets of primitives is determined based on a difference between a sampling point of a first primitive of the first subset of primitives and a point of a second primitive of the second subset of primitives closest to the sampling point.

5. The method of claim 1, wherein the determining the second subset of primitives comprises:
    determining a first primitive of the set of primitives excluding the first subset of primitives, the first primitive being within a threshold distance of a sampling point associated with a second primitive of the first subset of primitives, the first primitive having a first point $d_{t,max}$ along one axis and a second point $d_{t,min}$ less than $d_{t,max}$ along the one axis, the second primitive having a first point $d_{s,max}$ along the one axis and a second point $d_{s,min}$ less than $d_{s,max}$ along the one axis;
    determining whether a difference between $d_{s,min}$ and $d_{t,max}$ is less than the threshold depth when $d_{s,min}$ is greater than $d_{t,max}$, and whether a difference between $d_{t,min}$ and $d_{s,max}$ is less than the threshold depth when $d_{t,min}$ is greater than $d_{s,max}$; and
    including the first primitive in the second subset of primitives when the difference is less than the threshold depth.

6. The method of claim 5, wherein the threshold depth varies between a first threshold $\Delta_{abs}$ and a second threshold $\Delta_{abs}$ $\Delta_{dyn}$ based on an angle between normal vectors of the first and second primitives, wherein $\Delta_{abs}$ and $\Delta_{dyn}$n are each greater than zero.

7. The method of claim 6, further comprising:
    determining a gap with a gap length between the first primitive and the second primitive;
    increasing $\Delta_{dyn}$ by scaling $\Delta_{dyn}$ up based on the determined gap length.

8. The method of claim 7, further comprising:
    determining a sample point along one axis closest to the gap;
    determining primitives within the set of primitives excluding the first subset of primitives that are behind the first and second primitives with respect to the second viewpoint and are within at least partially the threshold distance from the sampling point along the one axis; and
including the determined primitives within the second subset of primitives.

9. The method of claim 1, wherein the determining the second subset of primitives of the set of primitives excluding the first subset of primitives comprises:
determining, for each primitive in the set of primitives excluding the first subset of primitives, during a conservative rasterization process the difference in depth between the primitive and a closest primitive of the first subset of primitives; and
including the primitive in the second subset of primitives upon determining the difference in depth between the primitive and the closest primitive of the first subset of primitives is less than the threshold depth.

10. An apparatus for graphics processing, comprising:
a memory; and
at least one processor coupled to the memory and configured to:
determine a first subset of primitives of a set of primitives associated with a set of objects within an image, wherein the first subset of primitives is based on a first viewpoint with respect to the set of objects;
determine, for a second viewpoint with respect to the set of objects, a second subset of primitives of the set of primitives excluding the first subset of primitives, the second subset of primitives having a difference in depth less than a threshold depth with respect to the first subset of primitives;
determine a size of primitives in the second subset of primitives;
mark the first subset of primitives and the second subset of primitives as visible; and
generate graphical content based on the marked first subset of primitives and the marked second subset of primitives.

11. The apparatus of claim 10, wherein the at least one processor is further configured to:
exclude primitives from the second subset of primitives with a size greater than a threshold.

12. The apparatus of claim 11, wherein the size is at least one of an area of the primitive or one or more edge lengths of the primitive.

13. The apparatus of claim 10, wherein the difference in depth between primitives in the first and second subsets of primitives is determined based on a difference between a sampling point of a first primitive of the first subset of primitives and a point of a second primitive of the second subset of primitives closest to the sampling point.

14. The apparatus of claim 10, wherein the determining the second subset of primitives further comprises the at least one processor configured to:
determine a first primitive of the set of primitives excluding the first subset of primitives, the first primitive being within a threshold distance of a sampling point associated with a second primitive of the first subset of primitives, the first primitive having a first point $d_{t,max}$ along one axis and a second point $d_{t,min}$ less than $d_{t,max}$ along the one axis, the second primitive having a first point $d_{s,max}$ along one axis and a second point $d_{s,min}$ less than $d_{s,max}$ along the one axis;
determine whether a difference between $d_{s,min}$ and $d_{t,max}$ is less than the threshold depth when $d_{s,min}$ is greater than $d_{t,max}$, and whether a difference between $d_{t,min}$ and $d_{s,max}$ is less than the threshold depth when $d_{t,min}$ is greater than $d_{s,max}$; and
include the first primitive in the second subset of primitives when the difference is less than the threshold depth.

15. The apparatus of claim 14, wherein the threshold depth varies between a first threshold $\Delta_{abs}$ and a second threshold $\Delta_{abs}$ $\Delta_{dyn}$ based on an angle between normal vectors of the first and second primitives, wherein $\Delta_{abs}$ and $\Delta_{dyn}$ are each greater than zero.

16. The apparatus of claim 15, wherein the at least one processor is further configured to:
determine a gap with a gap length between the first primitive and the second primitive;
increase $\Delta_{dyn}$ by scaling $\Delta_{dyn}$ up based on the determined gap length.

17. The apparatus of claim 16, wherein the at least one processor is further configured to:
determine a sample point along one axis closest to the gap;
determine primitives within the set of primitives excluding the first subset of primitives that are behind the first and second primitives with respect to the second viewpoint and are within at least partially the threshold distance from the sampling point along the one axis; and
include the determined primitives within the second subset of primitives.

18. The apparatus of claim 10, wherein the determining the second subset of primitives of the set of primitives excluding the first subset of primitives further comprises the at least one processor configured to:
determine, for each primitive in the set of primitives excluding the first subset of primitives, during a conservative rasterization process the difference in depth between the primitive and a closest primitive of the first subset of primitives; and
include the primitive in the second subset of primitives upon determining the difference in depth between the primitive and the closest primitive of the first subset of primitives is less than the threshold depth.

19. An apparatus for graphics processing, comprising:
means for determining a first subset of primitives of a set of primitives associated with a set of objects within an image, wherein the first subset of primitives is based on a first viewpoint with respect to the set of objects;
means for determining, for a second viewpoint with respect to the set of objects, a second subset of primitives of the set of primitives excluding the first subset of primitives, the second subset of primitives having a difference in depth less than a threshold depth with respect to the first subset of primitives;
means for determining a size of primitives in the second subset of primitives;
means for marking the first subset of primitives and the second subset of primitives as visible; and
means for generating graphical content based on the marked first subset of primitives and the marked second subset of primitives.

20. The apparatus of claim 19, further comprising:
means for excluding primitives from the second subset of primitives with a size greater than a threshold.

21. The apparatus of claim 20, wherein the size is at least one of an area of the primitive or one or more edge lengths of the primitive.

22. The apparatus of claim 19, wherein the difference in depth between primitives in the first and second subsets of primitives is determined based on a difference between a sampling point of a first primitive of the first subset of primitives and a point of a second primitive of the second subset of primitives closest to the sampling point.

23. The apparatus of claim 19, wherein the means for determining the second subset of primitives is further configured to:
determine a first primitive of the set of primitives excluding the first subset of primitives, the first primitive being within a threshold distance of a sampling point associated with a second primitive of the first subset of primitives, the first primitive having a first point $d_{t,max}$ along one axis and a second point $d_{t,min}$ less than $d_{t,max}$ along the one axis, the second primitive having a first point $d_{s,max}$ along the one axis and a second point $d_{s,min}$ less than $d_{s,max}$ along the one axis;
determine whether a difference between $d_{s,min}$ and $d_{t,max}$ is less than the threshold depth when $d_{s,min}$ is greater than $d_{t,max}$, and whether a difference between $d_{t,min}$ and $d_{s,max}$ is less than the threshold depth when $d_{t,min}$ is greater than $d_{s,max}$; and
include the first primitive in the second subset of primitives when the difference is less than the threshold depth.

24. The apparatus of claim 23, wherein the threshold depth varies between a first threshold $\Delta_{abs}$ and a second threshold $\Delta_{abs}$ $\Delta_{dyn}$ based on an angle between normal vectors of the first and second primitives, wherein $\Delta_{abs}$ and $\Delta_{dyn}$ are each greater than zero.

25. The apparatus of claim 24, further comprising:
means for determining a gap with a gap length between the first primitive and the second primitive;
means for increasing $\Delta_{dyn}$ by scaling $\Delta_{dyn}$ up based on the determined gap length.

26. The apparatus of claim 25, further comprising:
means for determining a sample point along one axis closest to the gap;
means for determining primitives within the set of primitives excluding the first subset of primitives that are behind the first and second primitives with respect to the second viewpoint and are within at least partially the threshold distance from the sampling point along the one axis; and
means for including the determined primitives within the second subset of primitives.

27. The apparatus of claim 19, wherein the means for determining the second subset of primitives of the set of primitives excluding the first subset of primitives is further configured to:
determine, for each primitive in the set of primitives excluding the first subset of primitives, during a conservative rasterization process the difference in depth between the primitive and a closest primitive of the first subset of primitives; and
include the primitive in the second subset of primitives upon determining the difference in depth between the primitive and the closest primitive of the first subset of primitives is less than the threshold depth.

28. A non-transitory computer-readable medium storing computer executable code for graphics processing, the code when executed by a processor causes the processor to:
determine a first subset of primitives of a set of primitives associated with a set of objects within an image, wherein the first subset of primitives is based on a first viewpoint with respect to the set of objects;
determine, for a second viewpoint with respect to the set of objects, a second subset of primitives of the set of primitives excluding the first subset of primitives, the second subset of primitives having a difference in depth less than a threshold depth with respect to the first subset of primitives;
determine a size of primitives in the second subset of primitives;
mark the first subset of primitives and the second subset of primitives as visible; and
generate graphical content based on the marked first subset of primitives and the marked second subset of primitives.

29. The non-transitory computer-readable medium of claim 28, the code when executed by the processor further causes the processor to:
exclude primitives from the second subset of primitives with a size greater than a threshold.

30. The non-transitory computer-readable medium of claim 28, wherein the difference in depth between primitives in the first and second subsets of primitives is determined based on a difference between a sampling point of a first primitive of the first subset of primitives and a point of a second primitive of the second subset of primitives closest to the sampling point.

* * * * *